US012481672B2

(12) United States Patent
Bhaduri et al.

(10) Patent No.: US 12,481,672 B2
(45) Date of Patent: Nov. 25, 2025

(54) METRICS MANAGEMENT SYSTEM

(71) Applicant: Oracle International Corporation, Redwood Shores, CA (US)

(72) Inventors: Antariksha Bhaduri, Karnataka (IN); Kripa Kanchana Sivakumar, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/678,996

(22) Filed: May 30, 2024

(65) Prior Publication Data

US 2025/0231959 A1   Jul. 17, 2025

Related U.S. Application Data

(60) Provisional application No. 63/619,995, filed on Jan. 11, 2024.

(51) Int. Cl.
*G06F 16/25*   (2019.01)
(52) U.S. Cl.
CPC ................... *G06F 16/258* (2019.01)
(58) Field of Classification Search
CPC ...................................... G06F 16/258
USPC ....................................... 707/756
See application file for complete search history.

(56) References Cited

U.S. PATENT DOCUMENTS

| | | | |
|---|---|---|---|
| 9,658,910 B2 | 5/2017 | Poola et al. | |
| 10,872,087 B2 | 12/2020 | Guo et al. | |
| 11,106,442 B1 * | 8/2021 | Hsiao | H04L 67/02 |
| 11,256,719 B1 | 2/2022 | Saxena et al. | |
| 11,769,087 B2 | 9/2023 | Somashekairah et al. | |
| 12,367,217 B2 * | 7/2025 | Shaikh | G06F 16/278 |
| 2018/0089328 A1 * | 3/2018 | Bath | G06F 16/9538 |
| 2019/0095478 A1 * | 3/2019 | Tankersley | G06F 11/3419 |
| 2019/0113259 A1 | 4/2019 | Levin et al. | |
| 2019/0114343 A1 | 4/2019 | Guo et al. | |

(Continued)

FOREIGN PATENT DOCUMENTS

WO   2023080321 A1   5/2023

OTHER PUBLICATIONS

"Built by ML Practitioners, for ML Practitioners", Available online at: https://arize.com/platform-overview/, 2023, 2 pages.

(Continued)

*Primary Examiner* — Hicham Skhoun
(74) *Attorney, Agent, or Firm* — Kilpatrick Townsend & Stockton LLP

(57) ABSTRACT

A unified schema, such as a common metrics schema, is provided that can universally cater to different kinds of ML metrics generated by different ML pipelines and platforms. In certain implementations, a metrics management system is provided. The metrics management system is based upon the unified schema and provides a repository for storing ML-related metrics in which the metrics may be generated by different disparate pipelines or platforms. The metrics management system may include adapters, converters, layers, libraries, or combinations thereof that can receive metric data and can provide generalized data that can be consumed by various different types of downstream systems. The generalized data may be provided to a downstream system, such as a user interface, an adjustment module, etc.

20 Claims, 10 Drawing Sheets

(56) References Cited

U.S. PATENT DOCUMENTS

| | | | |
|---|---|---|---|
| 2019/0236149 A1* | 8/2019 | Kuruvada | G06F 16/14 |
| 2021/0125725 A1* | 4/2021 | Allen | G16H 50/30 |
| 2023/0014551 A1 | 1/2023 | Chang et al. | |
| 2023/0162049 A1 | 5/2023 | Hall et al. | |
| 2023/0186144 A1 | 6/2023 | Lopatecki et al. | |
| 2023/0409524 A1 | 12/2023 | Bhattacharya et al. | |
| 2024/0295974 A1* | 9/2024 | Badii | G06F 3/0653 |
| 2024/0298294 A1 | 9/2024 | Feng et al. | |
| 2024/0320231 A1 | 9/2024 | Bhattacharjee et al. | |

OTHER PUBLICATIONS

"Handling Large Datasets in Pandas (Memory Optimisation)", Available online at: https://www.scaler.com/topics/pandas/handling-large-datasets-in-pandas/, accessed Oct. 4, 2023. 11 pages.

"Multi-output Classification Example with MultiOutputClassifier in Python", Available Online at: https://www.datatechnotes.com/2020/03/multi-output-classification-with-multioutputclassifier.html, Mar. 4, 2020, 3 pages.

"Multi-Output Classification with Machine Learning", Available Online at: https://www.section.io/engineering-education/multi-output-classification-with-machine-learning/, Jan. 21, 2022, 11 pages.

"Multioutput Regression", Available Online at: https://scikit-learn.org/stable/modules/multiclass.html#multioutput-regression, 2009, 2 pages.

"What is ML Observability", Available online at: https://docs.arize.com/arize/what-is-ml-observability, 2023, 2 pages.

"WhyLabs AI Observability", Available online at: https://docs.whylabs.ai/docs/, 2023, 4 pages.

Cloud , "Using Tensorflow Datasets and Estimators with More Data than RAM", Available online at: https://saturncloud.io/blog/using-tensorflow-datasets-and-estimators-with-more-data-than-ram/, Jul. 6, 2023, 4 pages.

Heydarian et al., "MLCM: Multi-Label Confusion Matrix", IEEE Access, vol. 10, Feb. 11, 2022, pp. 19083-19095.

Karajgi , "Evaluating Multi-Label Classifiers", Available Online at: https://towardsdatascience.com/evaluating-multi-label-classifiers-a31be83da6ea, Nov. 2, 2021, 26 pages.

Khammal , "Apache Spark and Data Observability a Technical Deep Dive", Available online at: https://www.kensu.io/blog/apache-spark-and-data-observability-a-technical-deep-dive, 2023, 3 pages.

Krasoulis et al., "Myoelectric Digit Action Decoding with Multi-output, Multi-class Classification: An Offline Analysis", Scientific Reports, vol. 10, Oct. 9, 2020, 10 pages.

Nguyen et al., "Azureml Observability: a Scalable and Extensible Solution for ML Monitoring and Drift Detection", Available online at: https://techcommunity.microsoft.com/t5/ai-machine-learning-blog/azureml-observability-a-scalable-and-extensible-solution-for-ml/ba-p/3474066, Jun. 14, 2022, 18 pages.

Ramanujam et al., "MLMO-HSM: Multi-label Multi-output Hybrid Sequential Model for Multi-resident Smart Home Activity Recognition", Journal of Ambient Intelligence and Humanized Computing, vol. 14, Dec. 11, 2022, pp. 2313-232.

Rosebrock , "Keras: Multiple Outputs and Multiple Losses", Available Oline at: https://pyimagesearch.com/2018/06/04/keras-multiple-outputs-and-multiple-losses/, Jun. 4, 2018, 32 pages.

Sen , "Ensemble Modeling for Neural Networks using large datasets—Simplified", Available online at: https://www.analyticsvidhya.com/blog/2021/10/ensemble-modeling-for-neural-networks-using-large-datasets-simplified/, Nov. 9, 2021, 9 pages.

TARIQ , "What is the Difference Between Micro and Macro Averaging?", Available Online at: https://www.educative.io/answers/what-is-the-difference-between-micro-and-macro-averaging, Accessed from Internet on Oct. 30, 2023, 4 pages.

Tuychiev , "Comprehensive Guide to Multiclass Classification Metrics", Available Online at: https://towardsdatascience.com/comprehensive-guide-on-multiclass-classification-metrics-af94cfb83fbd, Jun. 9, 2021, 11 pages.

Wang et al., "Consistent Classification with Generalized Metrics", Department of Computer Science, University of Illinois at Urbana-Champaign, Aug. 24, 2019, 26 pages.

Xu et al., "A Survey on Multi-output Learning", Available Online at: https://arxiv.org/pdf/1901.00248.pdf, Oct. 13, 2019, pp. 1-21.

U.S. Appl. No. 18/655,946, Notice of Allowance mailed on Apr. 1, 2025, 10 pages.

Lutov et al., Accuracy Evaluation of Overlapping and Multi-Resolution Clustering Algorithms on Large Datasets, Available Online at: https://arxiv.org/pdf/1902.01691, Feb. 14, 2019, 8 pages.

* cited by examiner

METRICS MANAGEMENT SYSTEM

CROSS-REFERENCE TO RELATED APPLICATION

This application claims priority to U.S. Provisional Application Ser. No. 63/619,995, filed Jan. 11, 2024 and titled "METRICS MANAGEMENT SYSTEM," the contents of which are incorporated herein by reference in their entirety.

FIELD

The present disclosure relates to machine-learning (ML) frameworks. More specifically, but not necessarily exclusively, a novel metrics management system is described that can receive ML-related metrics in different formats from different sources including different machine-learning pipelines and platforms, provide a unified schema for storing the received metrics using a common metrics schema, and provide the metrics on-demand to one or more consumers of the metrics in formats requested by the consumers where the consumers can also include different machine-learning pipelines and platforms.

BACKGROUND

Unlike traditional software, the issues facing machine-learning systems can be non-deterministic. Machine-learning models can be sensitive to changes in data quality and can often fail silently, such as produce incorrect predictions, which can lead to adverse impacts. Machine-learning observability is an upcoming area to evaluate, monitor and track machine-learning systems. Observability can span the entire machine-learning lifecycle, such as from problem-setup all the way to post-production monitoring, tracking changes in data and even performing root cause analysis and providing tooling to take corrective actions. While other machine-learning monitoring frameworks may be available, each of these may only fulfil some niche such as for structured data, unstructured data, distributed, drift, etc. Having multiple such frameworks can present flexibility to a machine-learning scientist, but it also creates problems like interoperability, standard GUI, deploying multiple framework in a single platform, etc.

BRIEF SUMMARY

The present disclosure relates to machine learning (ML) metrics, and more specifically to providing a unified schema, such as a common metrics schema, that can universally cater to different kinds of ML metrics generated by different ML pipelines and platforms. In certain implementations, a metrics management system is provided. The metrics management system is based upon the unified schema and provides a repository for storing ML-related metrics, where the metrics may be generated by different disparate pipelines or platforms. The metrics management system may include adapters, converters, layers, libraries, or combinations thereof that can receive metric data and can provide data in a common metrics format that can be consumed by various different types of downstream systems. The data in the common metrics format may be provided to a downstream system, such as a user interface, an adjustment module, etc.

Various embodiments are described herein, including methods, systems, non-transitory computer-readable storage media storing programs, code, or instructions executable by one or more processors, and the like. Some embodiments may be implemented by using a computer program product, comprising computer program/instructions which, when executed by a processor, cause the processor to perform any of the methods described in the disclosure.

According to certain embodiments, a method can be used to provide a managed metrics store for generalizing metric data for use in downstream systems. The method can include receiving, by a metrics management system, first metric data for a first metric related to machine-learning. The method can include determining, by the metrics management system, a first metric data type for the first metric. The method can include identifying, by the metrics management system, a first adapter for processing the received first metric. The method can include generating first common metrics format data for the first metric based upon the first metric data and using the first adapter. The generating can include converting the first metric data from the first metric data type to a common metrics format specified by a common metrics schema. The method can include storing, by the metrics management system, the first common metrics format data in a memory store. The method can include, responsive to a first request from a first requestor requesting the first metric in a first requestor format, providing, by the metrics management system, the first metric to the first requestor in the first requestor format using the stored first common metrics format data.

In certain embodiments, the common metrics format can include a set of fields, and the set of fields can include a metric description, a variable count, a variable dimension, a variable name, a variable type, a unit, a variable data type, raw data, and a type converter. The variable type can be selected from a group consisting of nominal, categorical, and continuous, and the variable data type can be selected from a group consisting of integer, float, fraction, percentage, array, string, and tensor. The raw data can be a blob representation of the received first metric data.

In certain embodiments, the method can additionally include identifying a set of data included in the first metric data, and the set of data corresponds to the set of fields. In some embodiments, generating the first common metrics format data can include identifying, for each field of the set of fields, corresponding data included in the set of data to convert the first metric data.

In certain embodiments, receiving the first metric data can include receiving the first metric data from a first particular source, and identifying the first adapter can include, based at least in part on the first particular source, identifying the first adapter as corresponding to the first particular source.

In certain embodiments, the method can additionally include (i) receiving second metric data for a second metric related to machine-learning; (ii) determining a second metric data type for the second metric; (iii) identifying a second adapter for processing the received second metric; (iv) generating second common metrics format data for the second metric based upon the second metric data and using the second adapter, the generating comprising converting the second metric data from the second metric data type to the common metrics format; (v) storing the second common metrics format data in the memory store; and (vi) responsive to a second request from a second requestor requesting the second metric in a second requestor format, providing the second metric to the second requestor in the second requestor format using the stored second common metrics format data.

In certain embodiments, receiving the second metric data can include receiving the second metric data from a second particular source that is different that a first particular source associated with the first metric data, and the second adapter can be different than the first adapter.

In certain embodiments, generating first common metrics format data can include (i) extracting predefined data from the first metric data for at least a subset of a set of fields included in the common metrics format; (ii) using the first adapter to call a particular type converter to convert the first metric data from the first metric data type to the common metrics format; and (iii) converting, using the particular type converter, the first metric data from the first metric data type into a blob or a list of list of strings for at least one field of the set of fields to prevent data from being lost during processing.

A method can include providing a unified schema for storing metrics data received from a set of one or more machine learning platforms or pipelines.

The foregoing, together with other features and embodiments will become more apparent upon referring to the following specification, claims, and accompanying drawings.

DETAILED DESCRIPTION

Figure 1:
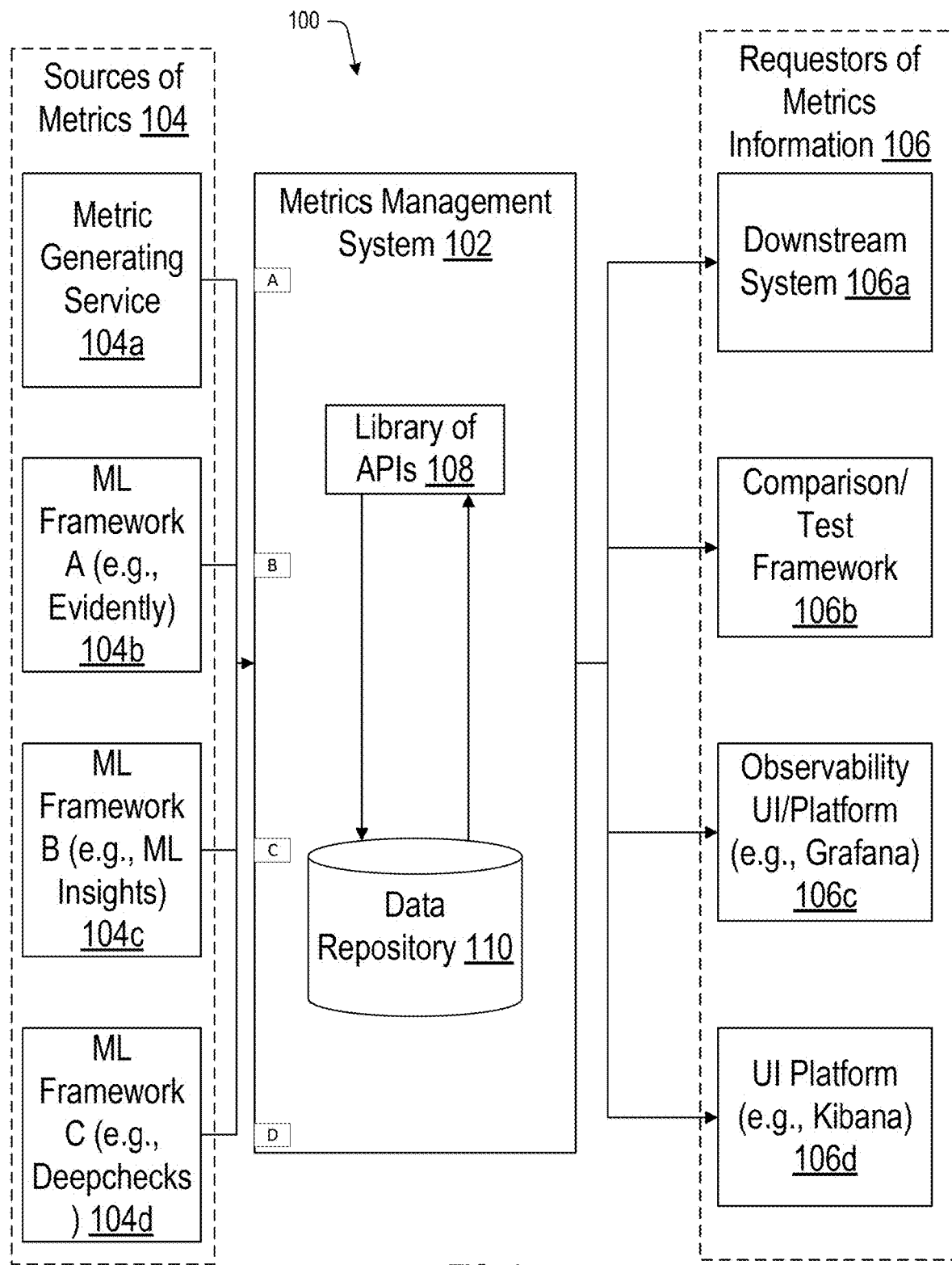
FIG. 1 is a simplified diagram of an architecture for facilitating a metrics management system, according to at least one embodiment
Figure 2:
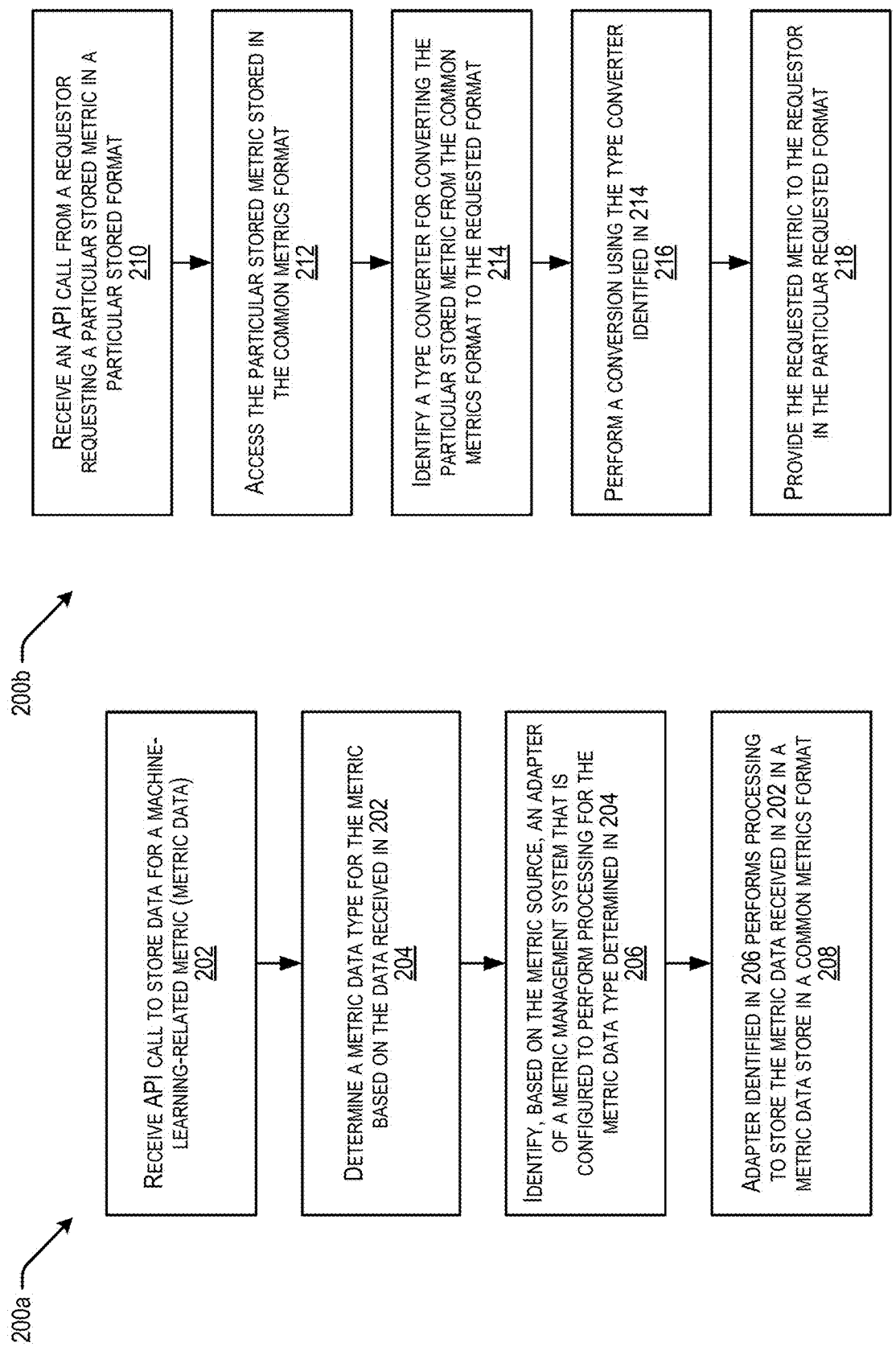
FIG. 2A is a flowchart of a process for storing metric data, which can be received from sources of metrics, in a common metrics format, according to at least one embodiment.
FIG. 2B is a flowchart of a process for providing metric data to requestors of metrics information using a metrics management system, according to at least one embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

With the growing popularity of machine learning (ML) solutions, a large amount of data is generated related to ML pipelines. This data can include data related to ML models, training environments, performance metrics for models, ML data, and the like. Different ML pipelines and platforms generate different formats of data that are customized to the platforms and/or pipelines. Presently, due to the large size of the data and the non-uniformity of the data, it is very difficult to get insights, such as shape, distribution, etc., from the data. It is difficult to evaluate any problems with the data, such as missing data issues, data quality issues, data integrity issues, bias issues, and the like. This put limitations on the use of the data.

For example, metrics associated with ML pipelines and/or platforms presently come in various different flavors and formats. Specific tools exist for providing specific metrics, with each tool generating the metrics in the tool's customized or proprietary format. The metrics also vary a lot, for example in format, etc., because performance metrics are very different from bias metrics, which are very different from quality metrics, and so on. Due to the lack of a common schema or format for the metrics, there is a tight coupling between the tool that generates a metric, the storage of the metric, and downstream requestors or consumers of the metric such as UI packages for visualizing the metrics. There is, thus, a tight coupling between the metrics generation component or layer, the storage or access layer responsible for storing the metrics to memory and reading the metrics from memory, and the visualization layer. As a result of this tight coupling, when a new downstream requestor component, such as an alerting component and/or layer, is provided for using the metrics, special code has to be written for the component to enable the component to use the metrics generated by the different and disparate platforms.

The techniques described herein provide a solution to the above problems. A unified schema, such as a common metrics schema, is provided that can universally cater to different kinds of ML metrics generated by different ML pipelines and platforms. The common metrics schema accommodates for different formats, and the common metrics schema is extensible by design to accommodate new formats as the new formats arise, for example in the future.

The common metrics schema provides several features. The common metrics schema enables the metrics data to be stored in raw form, such as data stored as a blob in some use cases, such that no data is lost. For example, the complete information is preserved. The common metrics schema can provide logic for converting between different data types of the metrics. In certain implementations, the logic is in the form of converters that are provided by the common metrics schema, or that can be customized, for easy conversions between metrics data types such as from a blob to a float. The common metrics schema can also cater to and can be used with open source libraries such as Deepcheck, etc. The common metrics schema also facilitates adapters for storing, such as serializing, and extracting different types of ML metrics from different sources or storage memories. The common metrics schema provides functions or APIs that can be called by a user for performing various function related to the metrics data such as conversion, reading/writing from memory, etc. The common metrics schema is open to and can handle new metric types that may be designed in the future.

In certain implementations, a metrics management system is provided. The metrics management system is based on the common metrics schema and provides a repository for storing and otherwise managing ML-related metrics in which the metrics may be generated by different and/or disparate pipelines or platforms.

Certain aspects and features of the present disclosure relate to a metrics management system, such as a unified data representation, that can generate and/or store metric data in a common metrics format based on received metric data. The metric data may relate to a metric that can relate to machine-learning. For example, the metric may be about a machine-learning model, data associated with the model, training of the model, etc. The metrics management system may include adapters, converters, layers, libraries, and the like that can enable the metrics management system to convert the received metric data to the metric data in the common metrics format. The metric data can include performance data, bias and fairness data, and the like relating to machine-learning, and the metric data can be generated and/or output in various ways or types. For example, the metric data may include scalars, vectors, tensors, or the like. Downstream systems, such as user interfaces, adjustment modules, etc., may be configured to receive and/or process metric data in a particular way. For example, a user interface may be configured to receive metric data as an array and to generate a visualization of the array, but the metric data may not be originally generated as an array. The metrics management system can be used to convert the metric data into the metric data in the common metrics format that can be further converted into an appropriate input data type for the downstream system or to otherwise suitably provide the metric data in the common metrics format to the downstream system.

Metric data can be generated and used to monitor health or performance of systems, frameworks, and/or models, to improve the health or performance of the systems, frameworks, and/or models, etc. For example, the metric data can include a fairness and bias metric of a machine-learning model, can include a performance metric data that can characterize a performance of machine-learning, can include quality metric data that can characterize a quality or performance of data used by or generated by machine-learning, and the like. For some use cases, such as machine-learning, metric data can range from simple scores, such as a scalar, to very complex scores, such as one or more tensors, multi-dimensional arrays, and the like. Different frameworks and systems can store metrics in different formats, which can make it difficult to create an abstract layer without manually generating complex code. Problems arising from having different frameworks computing these metrics can include:

Different machine-learning monitoring frameworks can be built to cater to a specific niche within the overall machine-learning observability domain. For example, a first framework may be used to calculate drift metrics while a second framework may have specific metrics only for fairness and bias. However, a production-level monitoring platform should be capable of computing all these groups of metrics. But, the disparate nature of the metric representation can make it difficult to use the different frameworks at the same time.

Metrics calculated by the frameworks may involve a user interface layer as visualization can be an important aspect of the machine-learning observability. However, different metric representations by different frameworks can make integration difficult. Also, a tight coupling can present additional issues. For example, small changes in either framework may yield a change in the other one. It may also be difficult to change between UI frameworks.

The tight coupling problem may be important for other systems, such as post processing, testing, and alerting, in machine-learning monitoring. A predicate-based testing can become very framework-specific without a common schema and, hence, hard to create a generic implementation of the same.

A metrics management system, such as a unified data representation or a common metrics schema, can involve:

a layer between frameworks that can generate and/or manage metric data and other tools such as UI tools. The layer can allow any supported framework with an adapter to publish and present metric data to any supported UI tools.

a single way to store all data types, such as via generalized metric data or metric data in a common metrics format, making it easy to store and read data without any metric-specific knowledge. The single way to store all data types can facilitate integration with existing systems within an infrastructure without the need to change the existing systems.

the ability to easily write tests and/or thresholds on different metrics based on the stored data, for example if the types associated with the metrics match. The ability can be expanded to intra-framework tests as well. As an example, an entity can generate metrics of same types from evidently and deepchecks and run a test to see if they are similar, etc. Since the underlying schema remains the same, the storage option can be flexible such as a SQL DB vs no-SQL DB vs monitoring.

running additional post-processing computation on the data for transformations such as accuracy/precision to cost analysis, etc.

In some examples, the metrics management system can be or include a middle layer, which may include a library that can include or provide one or more application programming interfaces (APIs). An entity, which may use the schema discussed above, can use the library to convert the raw data into structured data, such as system-specific metric data, and to use the structured data for visualization, metric calculations, and the like. The library can be integrated into any other service and/or application. In some examples, using the library can obviate any external dependencies since code can be embedded. Hence, issues, such as API call failures, scalability, etc., may not be encountered while using the library. Additionally or alternatively, the library may not contribute to latency. Since no call is made over a network, no additional latency may be added on top of the time it takes for the type converter to run. Additionally or alternatively, building and releasing a library can be faster compared to a microservice and can have a faster development lifecycle than a microservice or other service, model, or the like.

FIGS. 1-5 describe examples and embodiments related to an architecture, techniques, and a computing environment that can be used to facilitate a metrics management system. FIGS. 6-9 depict examples of architectures for implementing cloud infrastructures for providing one or more cloud services, where the infrastructures may incorporate teachings described herein. FIG. 10 depicts a block diagram illustrating an example of a computer system or device, according to at least one embodiment.

Novel Architectures and Processes for a Metrics Management System

FIG. 1 is a simplified diagram of an architecture 100 for facilitating a metrics management system, according to at least one embodiment. In some examples, FIG. 1 illustrates an architecture that can enable received metric data to be converted to metric data in a common metrics format and to be provided to downstream systems such as requestor systems.

As illustrated in FIG. 1, a metrics management system 102 can serve as an intermediary between upstream computing devices and/or services, such as a metric generating service 104a, ML framework A 104b, ML framework B 104c, ML framework C 104d, and other sources of metrics 104, and downstream computing devices and/or services such as a downstream system 106a, a comparison or test framework 106b, an observability UI or platform 106c, a UI platform 106d, and other consumers of metrics information 106. In some embodiments, ML framework A 104b may be or include Evidently, ML framework B 104c may be or include ML Insights, ML framework C 104d may be or include Deepchecks, the observability UI or platform 106c may be or include Grafana, and the UI platform 106d may be or include Kibana, though other suitable examples of any or all of the preceding may be possible.

The metrics management system 102 may receive one or more API calls from one or more of the sources of metrics 104 to receive metric data about a metric, and the metrics management system 102 may receive one or more API calls from one or more of the requestors of metrics information 106 to provide metric data in a common metrics format and/or system-specific metric data such as a requestor format, which may differ among different requestors. The API calls may be defined by a library of APIs 108 included in the metrics management system 102, and the library of APIs 108 may be accessible by the sources of metrics 104 and/or the requestors of metrics information 106.

Examples of the sources of metrics 104 can include a metric generating service, an evidently service, a machine-learning insights service, and a deepchecks service, though other suitable examples of upstream computing devices are possible. In some examples, the sources of metrics 104 may be configured to generate one or more metrics relating to machine-learning, models, services, or the like. The metrics may be or include performance metrics about a performance of a machine-learning model, quality metrics about data, such as training data, output data, etc., associated with the machine-learning model, bias and fairness metrics about the machine-learning model, and the like. The sources of metrics 104, or any subset thereof, can transmit one or more API calls to the metrics management system 102 to transmit metric data to the metrics management system 102 in a particular format such as a metric data type.

In some examples, the metrics management system 102 can receive the one or more API calls and can select an adapter, and/or execute the adapter, to be used to convert the received metrics. For example, adapter A can be used for the metric generating service 104a, adapter B can be used for ML framework A 104b, and so on. The adapter can convert at least a portion of the received metric data into at least a portion of metric data in a common metrics format that can be used in various different types of downstream computing devices and/or services. In some examples, the adapter can call or otherwise execute a converter, such as a type converter, that can convert at least the remaining portions of the received metric data from the metric data type to remaining portions of the metric data in the common metrics format.

The adapter and/or the converter can convert each data point or set of data points included in the metric data to a generalized data point or set of data points based on a common metrics schema that includes a set of fields. The set of fields may include a metric description, a variable count, a variable dimension, a variable name, a variable type, a unit, a variable data type, raw data, and a type converter, though other suitable fields are possible for the common metrics schema. The metrics management system 102 may provide the adapter and/or the converter to the sources of metrics 104, or the metrics management system 102 may receive the metric data and may apply the adapter and/or the converter to the metric data prior to storing any data.

The metrics management system 102 may include or otherwise be communicatively coupled with a data repository 110. For example, the metrics management system 102 may include the data repository 110, may be configured to access the data repository 110, or the like. The metrics management system 102 can generate or otherwise receive the metric data in the common metrics format, such as via applying the adapter and/or the converter to the received metric data having the metric data type, and the metrics management system 102 can store the metric data in the common metrics format in the data repository 110 or can otherwise cause the metric data in the common metrics format to be stored in the data repository 110. The metric data in the common metrics format may be stored in the data repository 110 associated with a corresponding type converter for converting the metric data in the common metrics format into system-specific metric data for downstream computing devices and/or services.

The requestors of metrics information 106, or any subset thereof, can transmit an API call to the metrics management system 102 to request system-specific metric data such as metric data having a particular requestor format. In some examples the requestors of metrics information 106 can include a downstream system for further processing, a comparison and/or test service, a grafana service, a kibana service, a service for calculating additional metrics, or the like. Additionally or alternatively, the requestors of metrics information 106 can include a visualization service, such as a user interface, and/or an adjustment service, which may be configured to adjust one or more aspects, such as training processes or weights, etc., of the machine-learning model based on the metric data having the requestor format. The metrics management system 102 may receive the API call and may access, for example from the data repository 110, the metric data, or any subset thereof, in the common metrics format. The API call may include a particular or custom type converter for converting the metric data in the common metrics format to the system-specific metric data in the requestor format. In other examples, the metric data in the common metrics format may include or indicate a type converter accessible by the metrics management system 102 in which the type converter is intended to be used for converting the metric data in the common metrics format to the system-specific metric data in the requestor format. The metrics management system 102 can apply the type converter to the metric data in the common metrics format to generate the system-specific metric data in the requestor format and can transmit the system-specific metric data to the requestors of metrics information 106.

In some examples, the requestors of metrics information 106 can use the system-specific metric data in the requestor format to control the machine-learning model or to otherwise enhance the machine-learning model. For example, an adjustment service can receive the system-specific metric data in the requestor format and can adjust one or more features or aspects about the machine-learning model. In a particular example, the system-specific metric data in the requestor format may indicate an excessive bias or unfairness in the machine-learning model, and the adjustment service can adjust training data, weights, or other aspects of the machine-learning model to reduce a bias or improve a fairness of the machine-learning model. In another example, the system-specific metric data in the requestor format may indicate an excessive inaccuracy count in outputs of the machine-learning model, and the adjustment service can adjust training data, weights, or other aspects of the machine-learning model to reduce an inaccuracy rate or otherwise improve an accuracy and/or precision of outputs of the machine-learning model.

FIG. 2A is a flowchart of a process 200a for storing metric data, which can be received from sources of metrics, in a common metrics format, according to at least one embodiment.

At 202, metric data is received. The metric data can be generated for a metric. In some examples, the metric data can be received from upstream systems, computing devices, services, or the like. The upstream systems may be or include one or more computing devices or services that may be configured to generate metric data relating to machine-learning such as related to a machine-learning model, hyperparameters of a machine-learning model, data used or output by the machine-learning model, and the like. For example, the upstream systems may be configured to generate performance metric data, quality metric data, bias and fairness metric data, and the like relating to machine-learning. The upstream systems may make an API call to the metrics management system, which may provide a library of available API calls that can be made to the metrics management system. The metrics management system can receive the API call and can receive the metric data from the upstream systems.

At 204, a metric data type for the metric indicated by the metric data is determined. The metrics management system can receive the metric data and can infer or otherwise determine the metric data type for the metric indicated by the metric data. For example, the metrics management system can parse the metric data to identify different types of data, or format of data, included in the metric data. Some examples of data included in the metric data can include scalar data, such as mean, median, etc., vector or array data, such as quartiles, etc., and the like. Based on the data included in the metric data, the metrics management system can determine the metric data type for the received metric data.

At 206, an adapter of the metrics management system is identified. In some examples, the metrics management system can use the metric data type identified in 204 to identify and/or select the adapter. In other examples, the metrics management system can use the source associated with the metric data to identify and/or select the adapter. The adapter may be configured to perform processing for the identified metric data type and/or the identified metric source. For example, the adapter may be configured to extract predefined data for a subset of fields included in the common metrics format. For example, the adapter may be configured to extract a variable type, a number of variables, a metric description, and the like for one or more certain metric types. In a particular example, the adapter may be an adapter for a "median" metric type, and the adapter may be configured to process the median metric type to determine the number of variables included in the median metric type, the variable type of the median metric type, the metric description of the median metric type, and the like.

At 208, the adapter identified in 206 is used to process the metric data received in 202. The adapter can be used to generate common metrics format data based on the metric data having the metric data type. In some examples, the metrics management system executes the adapter to process the metric data received in 202. Executing the adapter can involve causing the adapter to process the metric data, causing the adapter to call one or more converters, and the like. The one or more converters may be or include type converters or other suitable data converters that can convert data, such as the metric data or any subset of data included therein, from one format to another format. In some examples, the adapter can call a type converter that can be used to convert the metric data from the metric data type to metric data in the common metrics format, which may include a set of fields based on the common metrics schema. The converter can convert the metric data from the metric data type into a blob or a list of list of strings for at least one field of the set of fields to ensure that no data is lost during processing. The converted metric data in the common metrics format may be stored as a stored metric using the metrics management system. For example, the metrics management system may include a metric store that is configured to receive and store data in the common metrics format.

In some examples, the common metrics schema can include a set of fields that can include a metric description, a variable count, a variable dimension, a variable name, a variable type, a unit, a variable data type, raw data, and a type converter, though other suitable fields are possible for the common metrics schema. The metric description may be or include a string that represents a name or description of corresponding metric data. For example, the metric description may be or include a metric name, a structure name, or the like. The variable count may be or include a number of separate variables that the metric exposes or with which is otherwise associated. The variable dimension may be or include a number of variables the corresponding metric data represents. The variable dimension may be long format and may represent a number of columns in the corresponding metric data. The variable name may be or include a list of strings or string-type data that is or includes a name or description of the corresponding metric data. In some examples, the variable name may be or include labels of an axis of a plot. The variable type may be or include a list of values that may define whether the corresponding metric data is nominal, categorical, or the like. The unit may be or include a unit, such as time, volume, or the like, for the corresponding metric data. The variable data type may be or include a list of values that may define the data type of the corresponding metric data. For example, the data type may include an integer, a float, a fraction, a percentage, an array, a tensor, and the like. In some examples, each of the variable data types may match a corresponding type converter. The raw data may be or include an actual representation of data in a list of list of string data. The list may be or include a blob as which the raw data can be stored at the managed metrics store. The type converter can be or include a technique and/or a snippet of code that can convert the blob for the corresponding metric data to structured data. In some examples, the type converter can be used by any system to convert the blob into a format that can support mathematical calculations based on the variable data types.

FIG. 2B is a flowchart of a process 200b for providing metric data to requestors of metrics information using a metrics management system, according to at least one embodiment.

At 210, an API call is received from a requestor to access a particular stored metric in a particular format. The requestor may be or include a downstream computing device or system that may use the stored metric, or a converted format thereof, to perform one or more tasks such as adjustments to models, etc. The requestor may transmit the API call to the metrics management system, and the metrics management system may receive the API call and take one or more actions in response to receiving the API call.

At 212, the metrics management system accesses the particular stored metric that is stored in the common metrics format. For example, the metrics management system can access the particular stored metric at a data repository that stores metric data in the common metrics format.

At 214, a type converter is identified by the metrics management system to convert the particular stored metric from the common metrics format to the requested format. The type converter may be stored with, or otherwise indicated by, the particular metric stored in the common metrics format. Additionally or alternatively, the API call transmitted by the requestor may include or indicate the type converter that can be used to convert the particular stored metric from the common metrics format to the requested format. The type converter may be configured to convert data from a blob to a float, a tensor, or other suitable system-specific formats that can be used by, or that may otherwise be requested by, the requestor.

At 216, the metrics management system performs a conversion using the type converter identified at 214. For example, the metrics management system can use the type converter to convert the data of the stored metric to the requested format. At 218, the stored metric is provided to the requestor in response to the API call. The metrics management system can make an API call, or return the received API call, to the requestor with the particular stored metric in the particular requested format.

Figure 3:
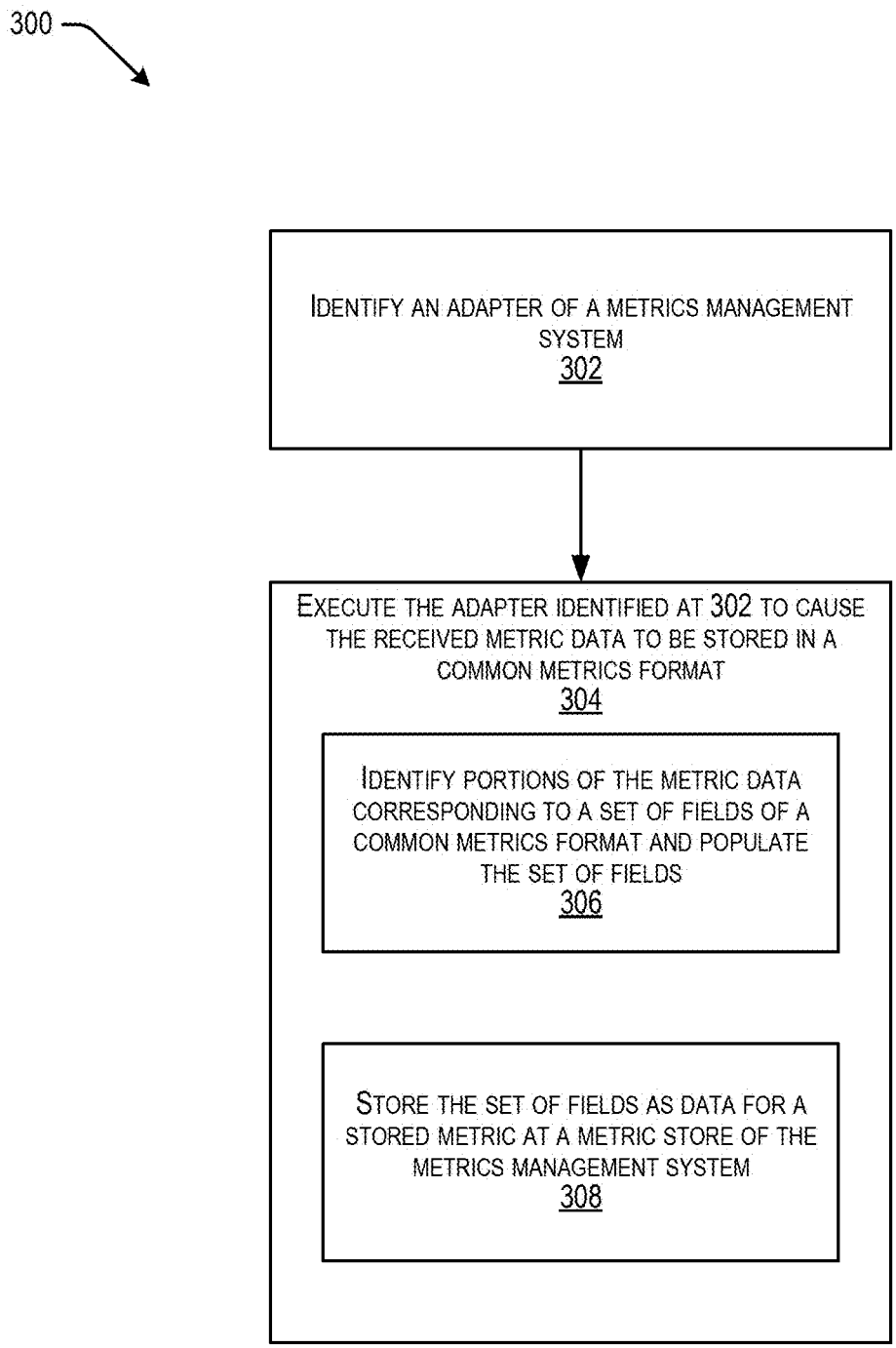
FIG. 3 is a flowchart of a process for converting received metric data to metric data in a common metrics format based on a common metrics schema associated with a metrics management system, according to at least one embodiment.

FIG. 3 is a flowchart of a process 300 for converting received metric data to metric data in a common metrics format using a common metrics schema of a metrics management system, according to at least one embodiment. In some embodiments, the process 300 may represent one or more operations that can be performed by the metrics management system to generate common metrics format data in the common metrics format and based at least in part on received metric data having a metric data type.

At 302, an adapter of a metrics management system is identified. The adapter may be identified based at least in part on received metric data associated with a metric for machine-learning monitoring or other suitable metrics. For example, the adapter may be associated with a particular metric data type and/or a metric source of the metric data. The adapter may be configured to perform processing for the metric data from the metric source. For example, the adapter may be configured to extract predefined data for a subset of fields included in the common metrics format based on the common metrics schema. In a particular example, the adapter may be configured to extract a variable type, a number of variables, a metric description, and the like for one or more certain metric types.

At 304, the adapter identified at 302 is executed to cause the received metric data to be stored in a common metrics format based on the common metrics schema. The metrics management system can receive the metric data, can identify the adapter, and can apply the adapter to the received metric data to cause the received metric data to be stored in the common metrics format. In some embodiments, executing the adapter can involve one or more conversions or other suitable operations for storing the received metric data in the common metrics format. In some examples, 306 and 308 describe operations that the adapter, or the metrics management system, can perform to cause the received metric data to be stored in the common metrics format based on the common metrics schema.

At 306, the adapter, or the metrics management system, can identify portions of the received metric data corresponding to fields of a set of fields of a common metrics schema used to generate common metrics format data according to the common metrics format and based on the received metric data and can populate the fields. For example, the adapter can determine the variable count field of a particular metric data point by identifying the number of variables associated with the particular metric data point. Additionally or alternatively, the adapter can determine the variable data type by identifying a type of data included with the particular metric data point. Additionally or alternatively, the adapter can determine the type converter, or a recommended type converter, by identifying the variable data type of the particular metric data point.

In some examples, the adapter can call, or can be used to call, a converter that can convert at least a portion of the received metric data to at least a portion of the common metrics format. The converter may receive the portion of the received metric data and can convert the portion to a blob, a list of list of strings, or other generalized format that can be stored as at least one field of the set of fields. In a particular example, the converter can convert the portion to a blob and store the blob in a "raw data" field of the common metrics format to prevent loss of data during conversion.

In some embodiments, the set of fields of the common metrics schema can be populated by the identified portions of the metric data. The populated set of fields may be or include the common metrics format data in the common metrics format for the received metric data. In some examples, the metrics management system, or any component thereof, such as the adapter and/or converter, can populate the set of fields based on identified features of the received metric data received from or identified by the adapter. In other examples, the adapter and/or the converter can populate the set of fields and transmit the populated set of fields to the metrics management system.

At 308, the populated set of fields is stored at the metrics management system in the common metrics format. In some examples, the metrics management system can receive the populated set of fields and can access a data repository, such as a metric store, at which to store the populated set of fields. The data repository may be included in the metrics management system, may be accessible or otherwise communicatively coupled with the metrics management system, or the like. The populated set of fields may be or include the metric data in the common metrics format, which may be or include a stored metric. For example, the set of fields may include enough information about the metric data to be converted into various other formats that can be consumed by various downstream systems without losing data, without requiring complicated and manually developed code, or the like.

Figure 4:
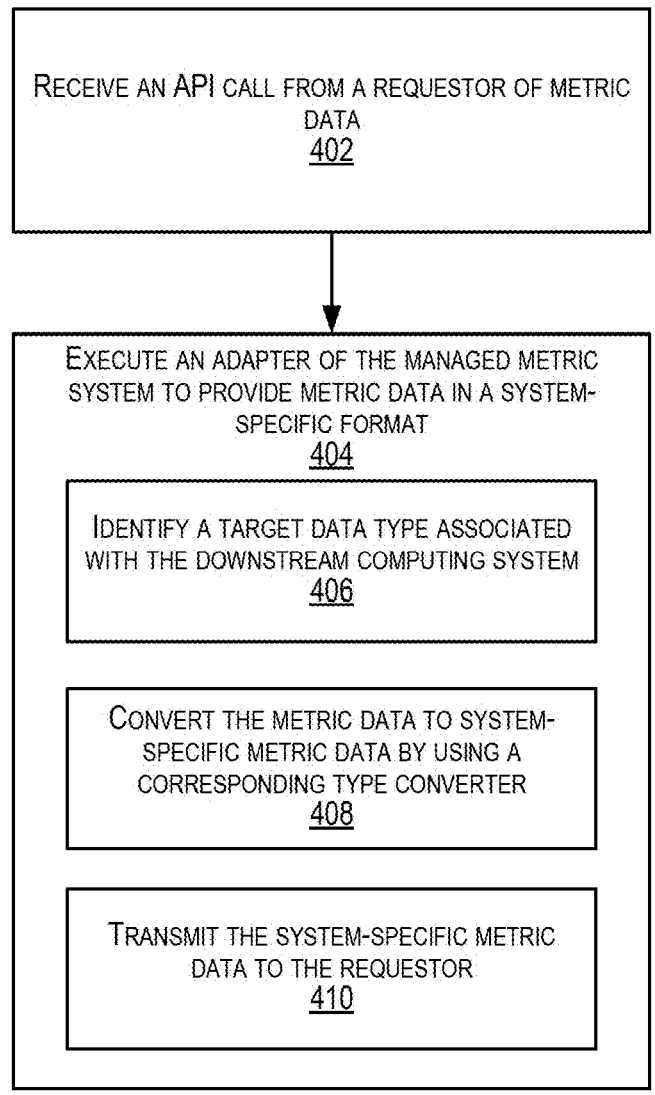
FIG. 4 is a flowchart of a process for converting metric data stored in a common metrics format to metric data in a requestor format using a metrics management system, according to at least one embodiment.

FIG. 4 is a flowchart of a process 400 for converting metric data stored in a common metrics format to system-specific metric data using a metrics management system, according to at least one embodiment. In some embodiment, the process 400 can represent one or more operations for converting the metric data from the common metrics format to a requestor format requested by a requestor of metrics information or other suitable downstream computing device and/or service.

At 402, an API call is received from a downstream system such as a requestor. The API call may indicate that the downstream system has requested system-specific metric data to consume and that the metric data in the common metrics format is to be converted to system-specific metric data, such as a requestor format, that can be consumed by the downstream system. The API call may be defined in a library that can be included in or otherwise provided by the metrics management system. The downstream system may be or include one or more computing devices, services, or the like that may be configured to use or process metric data. For example, the downstream system may be a user interface, an adjustment service, a post-processing service, and the like that can use metric data relating to machine-learning. The metrics management system can receive the API call from the downstream system and can access or otherwise receive the metric data in the common metrics format. For example, the metrics management system can access the data repository to receive the metric data in the common metrics format. Additionally or alternatively, the API call may include or indicate a type converter to use for converting the metric data in the common metrics format to the system-specific metric data.

At 404, a converter, such as a type converter, is executed to provide the metric data in response to the API call. In some examples, the metrics management system can execute the converter to convert the metric data in the common metrics format to the system-specific format to provide the metric data to the downstream system. In other examples, the metrics managements system can provide the metric data in the common metrics format and, in some examples, a particular type converter, to the downstream system, or other suitable system, to use to convert the metric data to the system-specific metric data. In some examples, 406, 408, and 410 describe operations that the converter, or other suitable component of the metrics management system, can perform to generate the system-specific metric data.

At 406, a target data type for the system-specific metric data is identified. The API call from the downstream system can include or indicate the target data type, which may be or include the requestor format. For example, the API call can include or indicate the type converter to use for converting the metric data in the common metrics format to the system-specific metric data. In other examples, the API call or information included in the API call can be parsed to determine the downstream system. The metrics management system can infer the target data type based at least in part on the downstream system, for example whether the downstream system is a user interface, an adjustment service, a post-processing service, etc.

At 408, the metric data in the common metrics format is converted to the system-specific metric data. The metrics management system can select the type converter to use to convert the metric data in the common metrics format to the system-specific metric data based on the identified target data type. For example, if the identified target data type is a float, then the metrics management system, or any component thereof, may select a blob-to-float type converter to apply to the metric data in the common metrics format. In other examples, the type converter may be received from the downstream system, and the received type converter can be used to convert the metric data in the common metrics format to the system-specific metric data. The metrics management system can apply the selected type converter to the metric data in the common metrics format to generate the system-specific metric data in the requestor format.

At 410, the system-specific metric data is transmitted to the requestor. The metrics management system can transmit the system-specific metric data to the downstream system. For example, the metrics management system can make an API call to the downstream system to transmit the system-specific metric data to the downstream system. In some examples, the downstream system can use the system-specific metric data to control the machine-learning model or to otherwise enhance the machine-learning model. For example, if the downstream system is an adjustment service, the downstream system can receive the system-specific metric data and can adjust one or more features or aspects about the machine-learning model. In a particular example, the system-specific metric data may indicate an excessive bias or unfairness in the machine-learning model, and the adjustment service can adjust training data, weights, or other aspects of the machine-learning model to reduce a bias or improve a fairness of the machine-learning model. In another example, the system-specific metric data may indicate an excessive inaccuracy count in outputs of the machine-learning model, and the adjustment service can adjust training data, weights, or other aspects of the machine-learning model to reduce an inaccuracy rate or otherwise improve an accuracy and/or precision of outputs of the machine-learning model.

Figure 5:
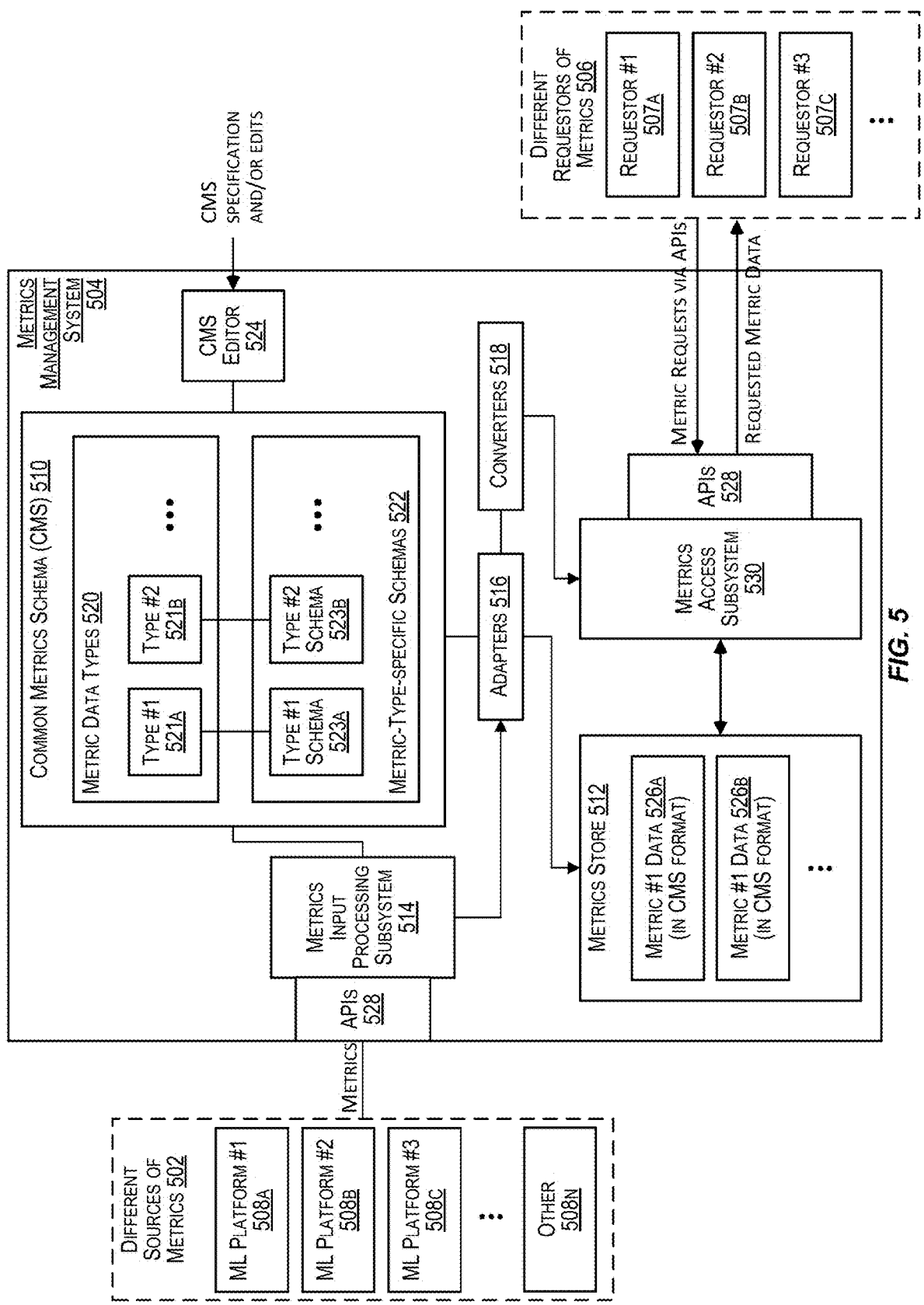
FIG. 5 is a block diagram of a computing environment that includes a metrics management system according to certain embodiments.

FIG. 5 is a block diagram of a computing environment 500 that includes a metrics management system according to certain embodiments. As illustrated in FIG. 5, the computing environment 500 can include metric sources 502, a metrics management system 504, and requestors 506, though the computing environment 500 can include any additional or alternative components, services, and the like. The metric sources 502 can include a first machine-learning platform 508a, a second machine-learning platform 508b, a third machine-learning platform 508c, other platforms 508n, and the like. Each of the platforms may be or include one or more machine-learning models or other suitable models that can be monitored and/or improved using metric data. Additionally or alternatively, each platform included in the metric sources 502 may produce one or more different metrics, and data associated therewith, about the corresponding model or models.

As illustrated in FIG. 5, the metrics management system 504 can include a common metrics schema 510 and a metrics store 512, though the metrics management system 504 can include any additional or alternative components, services, and the like. The metrics management system 504 can receive, at a metrics input processing subsystem 514, metric data from the metric sources 502. The metrics input processing subsystem 514 can provide the metric data to the common metrics schema 510, to adapters 516 of the metrics management system 504, or the like. In some examples, the metrics management system 504, or any suitable component, service, subsystem, or the like, can use the received metric data, or any metadata associated therewith, to identify a particular adapter or set of adapters of the adapters 516 that can process the metric data. The adapters 516 can include or otherwise call or invokes converters, such as converters 518, that can be used to convert the format of the received metric data.

In some examples, the common metrics schema 510 may include, define, or correspond to various metric data types, metric-specific schemas, and the like. For example, the common metrics schema 510 may include metric data types 520 (e.g., a first metric data type 521a, a second metric data type 521b, and so on) and metric-type-specific schemas 522 (e.g., a first schema 523a, a second schema 523b, and so on). The received metric data type may correspond to a particular metric data type defined by the metric data types 520, and a particular metric-type-specific schema of the metric-type-specific schemas 522 can be selected that corresponds to the particular metric data type. The particular metric-type-specific schema can be used, for example by the adapter or based on a selection of the adapter, to convert at least a portion of the received metric data into metric data in the common metrics format. In some examples, updates, maintenance, and the like to the common metrics schema 510 can be performed by a common metrics schema editor 524, which may be or include software, a machine-learning model, a separate computing device, or the like that can access and/or perform CRUD operations and other suitable operations with respect to the common metrics schema 510.

In response to using the adapters 516 and the converters 518 to convert the received metric data into common metrics format data in the common metrics format, the converted metric data can be store at the metrics store 512. For example, the converted metric data can include data for a first metric, a second metric, and so on. The converted metric data can be stored at the metrics store 512 as first metric data 526a and second metric data 526b, both of which may be in the common metrics format.

The requestors 506 may include a first requestor 507a, a second requestor 507b, and a third requestor 507c, though other suitable numbers of requestors are possible for the requestors 506. The requestors 506, or any subset thereof, can transmit an API or other suitable request to the metrics management system 504 to request the converted metric data. The API may be or be included in APIs 528, and the API may be received by or otherwise managed by a metrics access subsystem 530 that can control access to stored metric data. The API may cause the requested metric data to be access from the metrics store 512 and to be converted using a type converter to a particular metric format indicated by the API. For example, the API can include or indicate a particular type converter to use to convert the stored metric data in the common metrics format to system-specific metric data that can be transmitted to the requestors 506. The metrics management system 504 can convert the stored metric data to the system-specific metric data and can transmit the system-specific metric data in the requestor format to the requestors 506.

Exemplary Embodiment

There can be many tools, libraries, frameworks, etc. that can each cater to a specific aspect of a machine-learning monitoring platform. And, various components can make up a system for the machine-learning monitoring platform.

With machine-learning monitoring, management aspects can be exposed to certain trusted partners for which administrative APIs and management plane APIs can be exposed to certain internal or external entities. Management layer responsibilities can include:

Packaging the framework into an appropriate execution target-containers, artifacts, etc.
Executing the framework in a suitable execution environment.
Abstracting the engine from the entity.
Taking care of upkeep such as the framework updates, versioning of different framework releases, artifact compatibility across various framework revisions, such as backward compatibility, etc.

The framework, given that it standardizes the data types of different entities, can allow entities to define custom metrics, for example as long as the underlying native datatypes are supported. This can lead to a metric store and a UX layer that has to know only a particular metric's native data-type to render it into a chart or a graph. For example, a line graph and a bar chart can both operate on a series of numeric values pertaining to x and y axes. The logic behind the metric can become the metadata but may not break or affect the UX.

A middle layer can be created between a UI layer and metric generation frameworks. This can de-couple frameworks with UI tools, and they can be used interchangeably. Framework-agnostic usage can be employed. For example, a user can freely change frameworks without changing any downstream system dependent on metric. The change can be or include a running change. For example, a mean from a first time to a second time may be from a first framework but after the second time may be from a second framework, such as due to migration, without the need to backfill or change any downstream system. Metric-specific logic or knowledge may not be required for a large number of operations such as UI, comparison, calculation etc. Gaps between different frameworks can be closed, such as by using metrics available exclusively from different libraries, in the same application without added complexity. For example, if a first metric is available only in the first framework and a second metric is available only in the second framework, a user can import both and use them without the need to write a framework-specific metric format inference. Additional metrics can be generated from pre-calculated metrics from different frameworks. For example, a coefficient of variation can be calculated from a mean calculated using machine learning Insights and standard deviation calculated from deepchecks.

The common metrics schema can include the following components:

Metric Description—A string that gives a name or description to the data such as a metric name. This can be the structure name as well.
Variable Count—A number of separate variables that the metric exposes. This number can be kept to a minimum.
Variable Dimension—A number of variables the metric output represents such as 1D, 2D, etc. The variable dimension may be long format and may represent the number of columns that exist.
Variable Name—A list of strings, such as a list of string type, that gives a name or description to the variable. The variable name may be or include labels to an axis.
Variable Type—A list of enum that can define whether the variable is nominal, categorical, or the like.
Unit—Unit for each variable, if applicable.
Variable DataTypes—A list of enum that can define the data type of the variable. Examples of variable datatypes can include Integer, Fraction, Percentage, Array, etc. Each of the datatype enums may match a corresponding type converter.
Raw Data—The actual representation of data in a list of strings such as the list of string type variables. String can enable storing the data as a blob.
Type Converter—A technique or logic or snippet of code that can convert the raw data string blob for a variable to a structured data such as convert a string "5.4" to 5.4f.

In some examples, the type converter can be used by any system to convert the blob raw-data into a format that can support mathematical calculations based on the variable data types. Each variable data type enum may have a corresponding type converter. An example can include, for fraction data type, a Fraction Type Converter such as Float.ParseFloat (RawData [i][j]).

In some examples, a library, such as the library of APIs 108, can be provided and can offer some well-defined APIs. This way, any requestor of the internal schema can use the library to convert the raw data into structured data, use it for visualization, for metric calculations, and the like. The library can be used from a notebook or can be directly integrated into any other service or application. Features of the library can include:

no external dependencies: since the code may be embedded, no dependency on other system may be required. Issues, such as API call failures, scalability, and the like, are avoided.

no additional latency: since no call is made over a network, no additional latency will be additionally experienced except for the time for the type converter to run.

faster deployment cycle: building and releasing a library may be faster compared to performing the same via a microservice.

Examples of Architectures for Implementing Cloud Infrastructures

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed may need to be set up first. In some instances, the provisioning can be done manually, a provisioning tool may be utilized to provision the resources, and/or deployment tools may be utilized to deploy the code once the infrastructure is provisioned.

Figure 6:
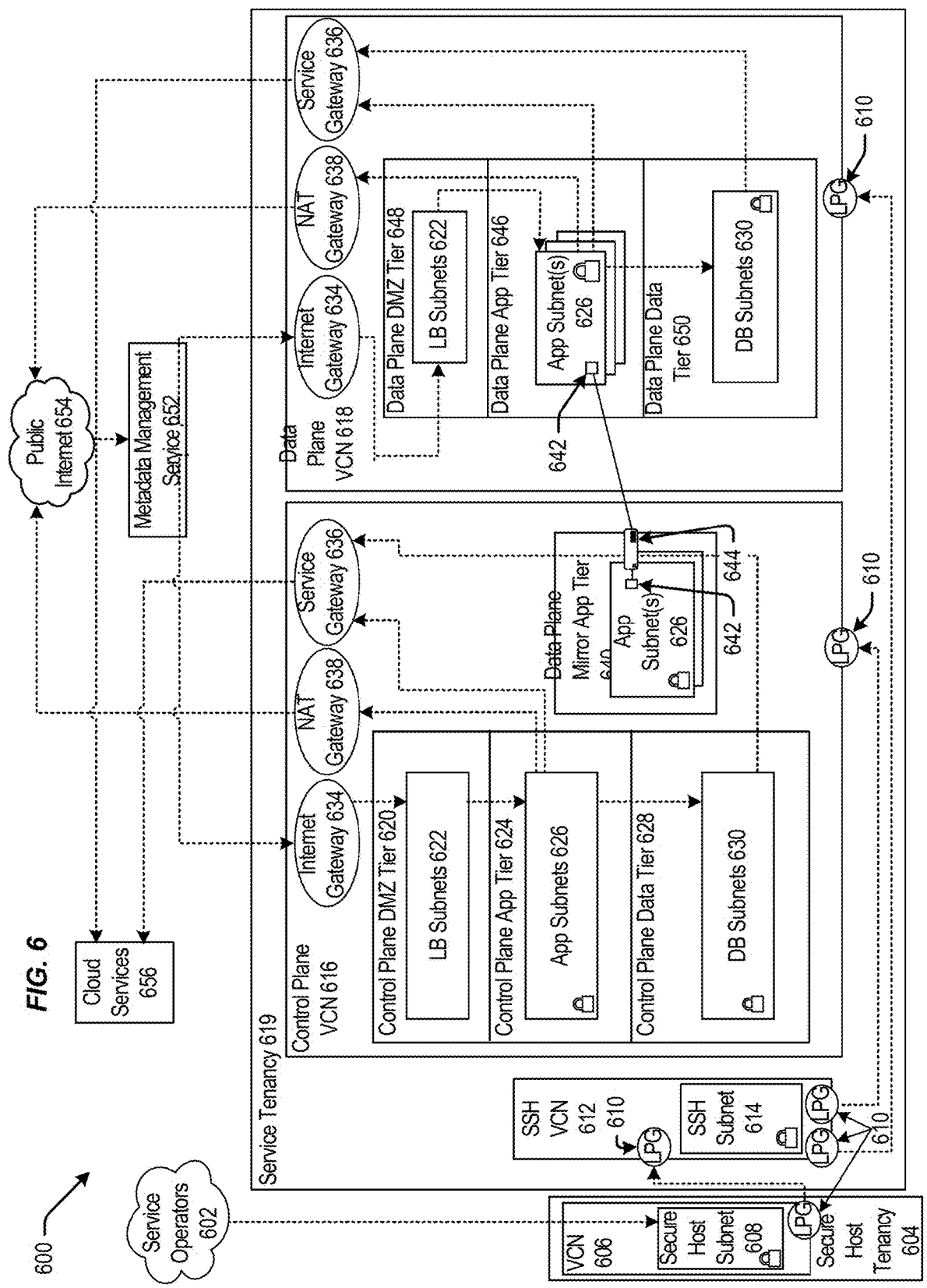
FIG. 6 is a block diagram illustrating one pattern for implementing a cloud infrastructure as a service system, according to at least one embodiment.

FIG. 6 is a block diagram 600 illustrating an example pattern of an IaaS architecture, according to at least one embodiment. Service operators 602 can be communicatively coupled to a secure host tenancy 604 that can include a virtual cloud network (VCN) 606 and a secure host subnet 608. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 606 and/or the Internet.

The VCN 606 can include a local peering gateway (LPG) 610 that can be communicatively coupled to a secure shell (SSH) VCN 612 via an LPG 610 contained in the SSH VCN 612. The SSH VCN 612 can include an SSH subnet 614, and the SSH VCN 612 can be communicatively coupled to a control plane VCN 616 via the LPG 610 contained in the control plane VCN 616. Also, the SSH VCN 612 can be communicatively coupled to a data plane VCN 618 via an LPG 610. The control plane VCN 616 and the data plane VCN 618 can be contained in a service tenancy 619 that can be owned and/or operated by the IaaS provider.

The control plane VCN 616 can include a control plane demilitarized zone (DMZ) tier 620 that acts as a perimeter network (e.g., portions of a corporate network between the corporate intranet and external networks). The DMZ-based servers may have restricted responsibilities and help keep breaches contained. Additionally, the DMZ tier 620 can include one or more load balancer (LB) subnet(s) 622, a control plane app tier 624 that can include app subnet(s) 626, a control plane data tier 628 that can include database (DB) subnet(s) 630 (e.g., frontend DB subnet(s) and/or backend DB subnet(s)). The LB subnet(s) 622 contained in the control plane DMZ tier 620 can be communicatively coupled to the app subnet(s) 626 contained in the control plane app tier 624 and an Internet gateway 634 that can be contained in the control plane VCN 616, and the app subnet(s) 626 can be communicatively coupled to the DB subnet(s) 630 contained in the control plane data tier 628 and a service gateway 636 and a network address translation (NAT) gateway 638. The control plane VCN 616 can include the service gateway 636 and the NAT gateway 638.

The control plane VCN 616 can include a data plane mirror app tier 640 that can include app subnet(s) 626. The app subnet(s) 626 contained in the data plane mirror app tier 640 can include a virtual network interface controller (VNIC) 642 that can execute a compute instance 644. The compute instance 644 can communicatively couple the app subnet(s) 626 of the data plane mirror app tier 640 to app subnet(s) 626 that can be contained in a data plane app tier 646.

The data plane VCN 618 can include the data plane app tier 646, a data plane DMZ tier 648, and a data plane data tier 650. The data plane DMZ tier 648 can include LB subnet(s) 622 that can be communicatively coupled to the app subnet(s) 626 of the data plane app tier 646 and the Internet gateway 634 of the data plane VCN 618. The app subnet(s) 626 can be communicatively coupled to the service gateway 636 of the data plane VCN 618 and the NAT gateway 638 of the data plane VCN 618. The data plane data tier 650 can also include the DB subnet(s) 630 that can be communicatively coupled to the app subnet(s) 626 of the data plane app tier 646.

The Internet gateway 634 of the control plane VCN 616 and of the data plane VCN 618 can be communicatively coupled to a metadata management service 652 that can be communicatively coupled to public Internet 654. Public Internet 654 can be communicatively coupled to the NAT gateway 638 of the control plane VCN 616 and of the data plane VCN 618. The service gateway 636 of the control plane VCN 616 and of the data plane VCN 618 can be communicatively coupled to cloud services 656.

In some examples, the service gateway 636 of the control plane VCN 616 or of the data plane VCN 618 can make application programming interface (API) calls to cloud services 656 without going through public Internet 654. The API calls to cloud services 656 from the service gateway 636 can be one-way: the service gateway 636 can make API calls to cloud services 656, and cloud services 656 can send requested data to the service gateway 636. But, cloud services 656 may not initiate API calls to the service gateway 636.

In some examples, the secure host tenancy 604 can be directly connected to the service tenancy 619, which may be otherwise isolated. The secure host subnet 608 can communicate with the SSH subnet 614 through an LPG 610 that may enable two-way communication over an otherwise isolated system. Connecting the secure host subnet 608 to the SSH subnet 614 may give the secure host subnet 608 access to other entities within the service tenancy 619.

The control plane VCN 616 may allow users of the service tenancy 619 to set up or otherwise provision desired resources. Desired resources provisioned in the control plane VCN 616 may be deployed or otherwise used in the data plane VCN 618. In some examples, the control plane VCN 616 can be isolated from the data plane VCN 618, and the data plane mirror app tier 640 of the control plane VCN 616 can communicate with the data plane app tier 646 of the data plane VCN 618 via VNICs 642 that can be contained in the data plane mirror app tier 640 and the data plane app tier 646.

In some examples, users of the system, or customers, can make requests, for example create, read, update, or delete (CRUD) operations, through public Internet 654 that can communicate the requests to the metadata management service 652. The metadata management service 652 can communicate the request to the control plane VCN 616 through the Internet gateway 634. The request can be received by the LB subnet(s) 622 contained in the control plane DMZ tier 620. The LB subnet(s) 622 may determine that the request is valid, and in response to this determination, the LB subnet(s) 622 can transmit the request to app subnet(s) 626 contained in the control plane app tier 624. If the request is validated and requires a call to public Internet 654, the call to public Internet 654 may be transmitted to the NAT gateway 638 that can make the call to public Internet 654. Metadata that may be desired to be stored by the request can be stored in the DB subnet(s) 630.

In some examples, the data plane mirror app tier 640 can facilitate direct communication between the control plane VCN 616 and the data plane VCN 618. For example, changes, updates, or other suitable modifications to configuration may be desired to be applied to the resources contained in the data plane VCN 618. Via a VNIC 642, the control plane VCN 616 can directly communicate with, and can thereby execute the changes, updates, or other suitable modifications to configuration to, resources contained in the data plane VCN 618.

In some embodiments, the control plane VCN 616 and the data plane VCN 618 can be contained in the service tenancy 619. In this case, the user, or the customer, of the system may not own or operate either the control plane VCN 616 or the data plane VCN 618. Instead, the IaaS provider may own or operate the control plane VCN 616 and the data plane VCN 618, both of which may be contained in the service tenancy 619. This embodiment can enable isolation of networks that may prevent users or customers from interacting with other users', or other customers', resources. Also, this embodiment may allow users or customers of the system to store databases privately without needing to rely on public Internet 654, which may not have a desired level of threat prevention, for storage.

In other embodiments, the LB subnet(s) 622 contained in the control plane VCN 616 can be configured to receive a signal from the service gateway 636. In this embodiment, the control plane VCN 616 and the data plane VCN 618 may be configured to be called by a customer of the IaaS provider without calling public Internet 654. Customers of the IaaS provider may desire this embodiment since database(s) that the customers use may be controlled by the IaaS provider and may be stored on the service tenancy 619, which may be isolated from public Internet 654.

Figure 7:
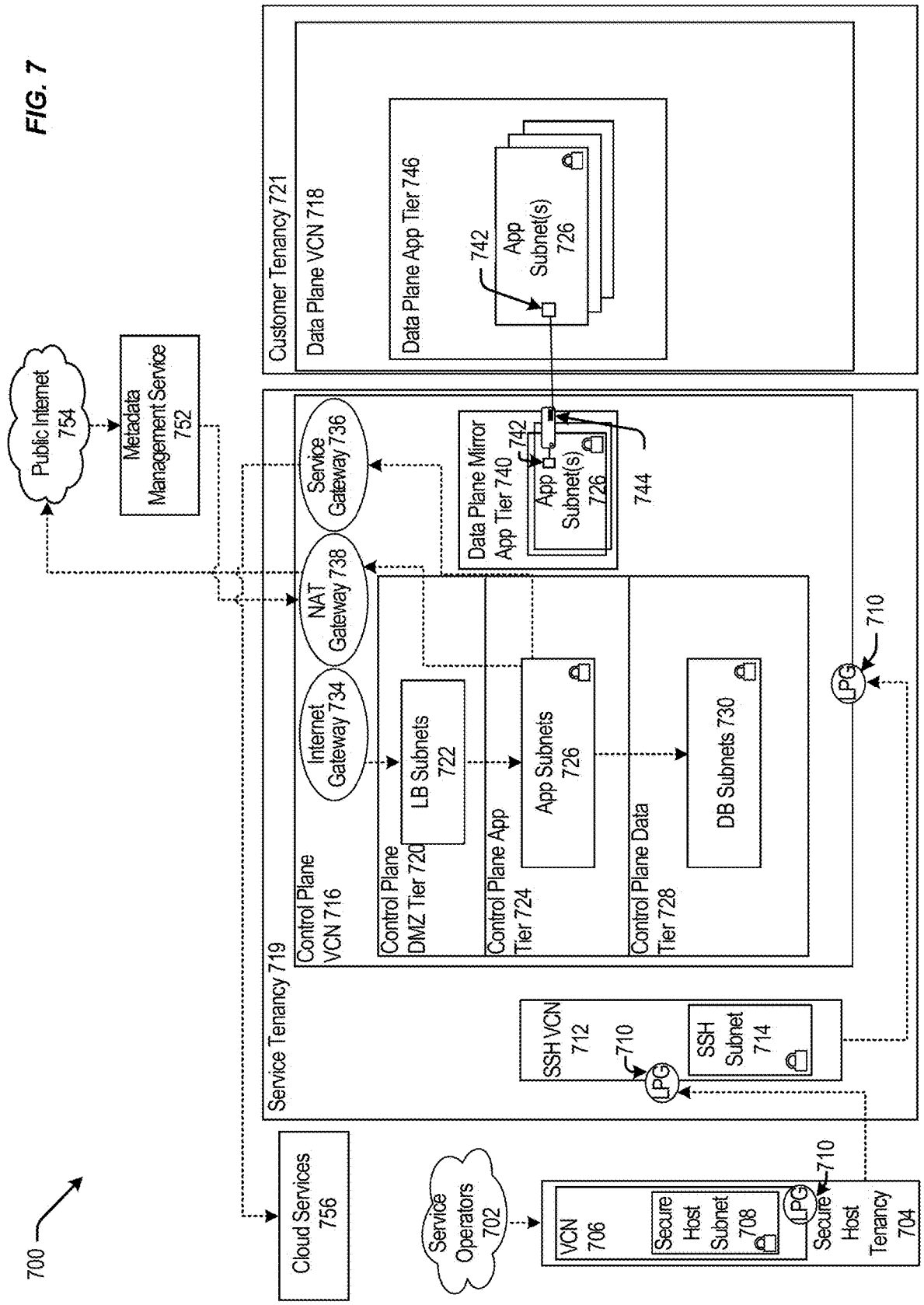
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g., service operators 602 of FIG. 6) can be communicatively coupled to a secure host tenancy 704 (e.g., the secure host tenancy 604 of FIG. 6) that can include a virtual cloud network (VCN) 706 (e.g., the VCN 606 of FIG. 6) and a secure host subnet 708 (e.g., the secure host subnet 608 of FIG. 6). The VCN 706 can include a local peering gateway (LPG) 710 (e.g., the LPG 610 of FIG. 6) that can be communicatively coupled to a secure shell (SSH) VCN 712 (e.g., the SSH VCN 612 of FIG. 6) via an LPG 610 contained in the SSH VCN 712. The SSH VCN 712 can include an SSH subnet 714 (e.g., the SSH subnet 614 of FIG. 6), and the SSH VCN 712 can be communicatively coupled to a control plane VCN 716 (e.g., the control plane VCN 616 of FIG. 6) via an LPG 710 contained in the control plane VCN 716. The control plane VCN 716 can be contained in a service tenancy 719 (e.g., the service tenancy 619 of FIG. 6), and the data plane VCN 718 (e.g., the data plane VCN 618 of FIG. 6) can be contained in a customer tenancy 721 that may be owned or operated by users, or customers, of the system.

The control plane VCN 716 can include a control plane DMZ tier 720 (e.g., the control plane DMZ tier 620 of FIG. 6) that can include LB subnet(s) 722 (e.g., LB subnet(s) 622 of FIG. 6), a control plane app tier 724 (e.g., the control plane app tier 624 of FIG. 6) that can include app subnet(s) 726 (e.g., app subnet(s) 626 of FIG. 6), a control plane data tier 728 (e.g., the control plane data tier 628 of FIG. 6) that can include database (DB) subnet(s) 730 (e.g., similar to DB subnet(s) 630 of FIG. 6). The LB subnet(s) 722 contained in the control plane DMZ tier 720 can be communicatively coupled to the app subnet(s) 726 contained in the control plane app tier 724 and an Internet gateway 734 (e.g., the Internet gateway 634 of FIG. 6) that can be contained in the control plane VCN 716, and the app subnet(s) 726 can be communicatively coupled to the DB subnet(s) 730 contained in the control plane data tier 728 and a service gateway 736 (e.g., the service gateway 636 of FIG. 6) and a network address translation (NAT) gateway 738 (e.g., the NAT gateway 638 of FIG. 6). The control plane VCN 716 can include the service gateway 736 and the NAT gateway 738.

The control plane VCN 716 can include a data plane mirror app tier 740 (e.g., the data plane mirror app tier 640 of FIG. 6) that can include app subnet(s) 726. The app subnet(s) 726 contained in the data plane mirror app tier 740 can include a virtual network interface controller (VNIC) 742 (e.g., the VNIC of 642) that can execute a compute instance 744 (e.g., similar to the compute instance 644 of FIG. 6). The compute instance 744 can facilitate communication between the app subnet(s) 726 of the data plane mirror app tier 740 and the app subnet(s) 726 that can be contained in a data plane app tier 746 (e.g., the data plane app tier 646 of FIG. 6) via the VNIC 742 contained in the data plane mirror app tier 740 and the VNIC 742 contained in the data plane app tier 746.

The Internet gateway 734 contained in the control plane VCN 716 can be communicatively coupled to a metadata management service 752 (e.g., the metadata management service 652 of FIG. 6) that can be communicatively coupled to public Internet 754 (e.g., public Internet 654 of FIG. 6). Public Internet 754 can be communicatively coupled to the NAT gateway 738 contained in the control plane VCN 716. The service gateway 736 contained in the control plane VCN 716 can be communicatively coupled to cloud services 756 (e.g., cloud services 656 of FIG. 6).

In some examples, the data plane VCN 718 can be contained in the customer tenancy 721. In this case, the IaaS provider may provide the control plane VCN 716 for each customer, and the IaaS provider may, for each customer, set up a unique compute instance 744 that is contained in the service tenancy 719. Each compute instance 744 may allow communication between the control plane VCN 716, contained in the service tenancy 719, and the data plane VCN 718 that is contained in the customer tenancy 721. The compute instance 744 may allow resources, that are provisioned in the control plane VCN 716 that is contained in the service tenancy 719, to be deployed or otherwise used in the data plane VCN 718 that is contained in the customer tenancy 721.

In other examples, the customer of the IaaS provider may have databases that live in the customer tenancy 721. In this example, the control plane VCN 716 can include the data plane mirror app tier 740 that can include app subnet(s) 726. The data plane mirror app tier 740 can reside in the data plane VCN 718, but the data plane mirror app tier 740 may not live in the data plane VCN 718. That is, the data plane mirror app tier 740 may have access to the customer tenancy 721, but the data plane mirror app tier 740 may not exist in the data plane VCN 718 or be owned or operated by the customer of the IaaS provider. The data plane mirror app tier 740 may be configured to make calls to the data plane VCN 718 but may not be configured to make calls to any entity contained in the control plane VCN 716. The customer may desire to deploy or otherwise use resources in the data plane VCN 718 that are provisioned in the control plane VCN 716, and the data plane mirror app tier 740 can facilitate the desired deployment, or other usage of resources, of the customer.

In some embodiments, the customer of the IaaS provider can apply filters to the data plane VCN 718. In this embodiment, the customer can determine what the data plane VCN 718 can access, and the customer may restrict access to public Internet 754 from the data plane VCN 718. The IaaS provider may not be able to apply filters or otherwise control access of the data plane VCN 718 to any outside networks or databases. Applying filters and controls by the customer onto the data plane VCN 718, contained in the customer tenancy 721, can help isolate the data plane VCN 718 from other customers and from public Internet 754.

In some embodiments, cloud services 756 can be called by the service gateway 736 to access services that may not exist on public Internet 754, on the control plane VCN 716, or on the data plane VCN 718. The connection between cloud services 756 and the control plane VCN 716 or the data plane VCN 718 may not be live or continuous. Cloud services 756 may exist on a different network owned or operated by the IaaS provider. Cloud services 756 may be configured to receive calls from the service gateway 736 and may be configured to not receive calls from public Internet 754. Some cloud services 756 may be isolated from other cloud services 756, and the control plane VCN 716 may be isolated from cloud services 756 that may not be in the same region as the control plane VCN 716. For example, the control plane VCN 716 may be located in "Region 1," and cloud service "Deployment 5," may be located in Region 1 and in "Region 2." If a call to Deployment 5 is made by the service gateway 736 contained in the control plane VCN 716 located in Region 1, the call may be transmitted to Deployment 5 in Region 1. In this example, the control plane VCN 716, or Deployment 5 in Region 1, may not be communicatively coupled to, or otherwise in communication with, Deployment 5 in Region 2.

Figure 8:
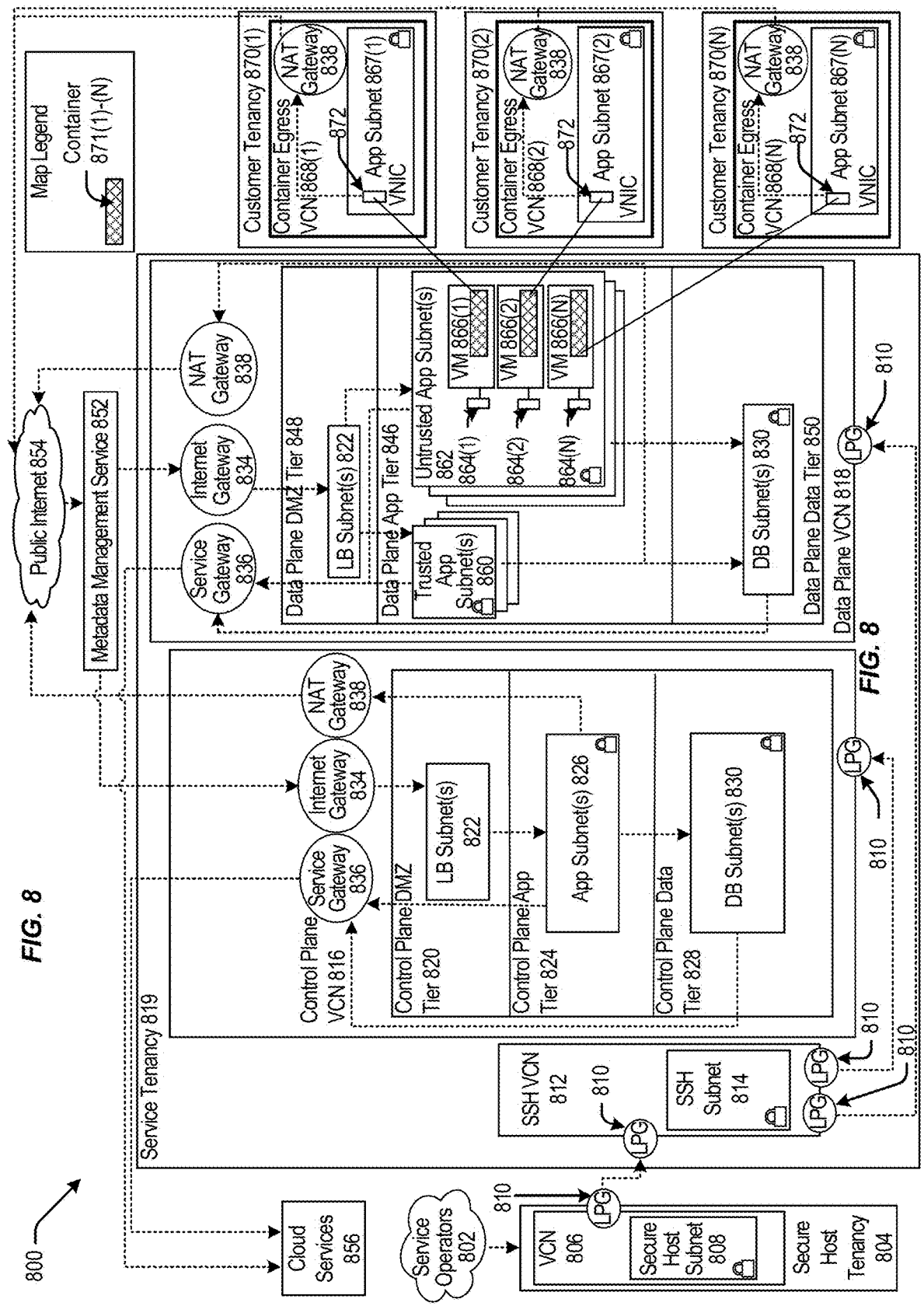
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g., service operators 602 of FIG. 6) can be communicatively coupled to a secure host tenancy 804 (e.g., the secure host tenancy 604 of FIG. 6) that can include a virtual cloud network (VCN) 806 (e.g., the VCN 606 of FIG. 6) and a secure host subnet 808 (e.g., the secure host subnet 608 of FIG. 6). The VCN 806 can include an LPG 810 (e.g., the LPG 610 of FIG. 6) that can be communicatively coupled to an SSH VCN 812 (e.g., the SSH VCN 612 of FIG. 6) via an LPG 810 contained in the SSH VCN 812. The SSH VCN 812 can include an SSH subnet 814 (e.g., the SSH subnet 614 of FIG. 6), and the SSH VCN 812 can be communicatively coupled to a control plane VCN 816 (e.g., the control plane VCN 616 of FIG. 6) via an LPG 810 contained in the control plane VCN 816 and to a data plane VCN 818 (e.g., the data plane 618 of FIG. 6) via an LPG 810 contained in the data plane VCN 818. The control plane VCN 816 and the data plane VCN 818 can be contained in a service tenancy 819 (e.g., the service tenancy 619 of FIG. 6).

The control plane VCN 816 can include a control plane DMZ tier 820 (e.g., the control plane DMZ tier 620 of FIG. 6) that can include load balancer (LB) subnet(s) 822 (e.g., LB subnet(s) 622 of FIG. 6), a control plane app tier 824 (e.g., the control plane app tier 624 of FIG. 6) that can include app subnet(s) 826 (e.g., similar to app subnet(s) 626 of FIG. 6), a control plane data tier 828 (e.g., the control plane data tier 628 of FIG. 6) that can include DB subnet(s) 830. The LB subnet(s) 822 contained in the control plane DMZ tier 820 can be communicatively coupled to the app subnet(s) 826 contained in the control plane app tier 824 and to an Internet gateway 834 (e.g., the Internet gateway 634 of FIG. 6) that can be contained in the control plane VCN 816, and the app subnet(s) 826 can be communicatively coupled to the DB subnet(s) 830 contained in the control plane data tier 828 and to a service gateway 836 (e.g., the service gateway of FIG. 6) and a network address translation (NAT) gateway 838 (e.g., the NAT gateway 638 of FIG. 6). The control plane VCN 816 can include the service gateway 836 and the NAT gateway 838.

The data plane VCN 818 can include a data plane app tier 846 (e.g., the data plane app tier 646 of FIG. 6), a data plane DMZ tier 848 (e.g., the data plane DMZ tier 648 of FIG. 6), and a data plane data tier 850 (e.g., the data plane data tier 650 of FIG. 6). The data plane DMZ tier 848 can include LB subnet(s) 822 that can be communicatively coupled to trusted app subnet(s) 860 and untrusted app subnet(s) 862 of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include one or more primary VNICs 864(1)-(N) that can be communicatively coupled to tenant virtual machines (VMs) 866(1)-(N). Each tenant VM 866(1)-(N) can be communicatively coupled to a respective app subnet 867(1)-(N) that can be contained in respective container egress VCNs 868(1)-(N) that can be contained in respective customer tenancies 870(1)-(N). Respective secondary VNICs 872(1)-(N) can facilitate communication between the untrusted app subnet(s) 862 contained in the data plane VCN 818 and the app subnet contained in the container egress VCNs 868(1)-(N). Each container egress VCNs 868(1)-(N) can include a NAT gateway 838 that can be communicatively coupled to public Internet 854 (e.g., public Internet 654 of FIG. 6).

The Internet gateway 834 contained in the control plane VCN 816 and contained in the data plane VCN 818 can be communicatively coupled to a metadata management service 852 (e.g., the metadata management system 652 of FIG. 6) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively coupled to cloud services 856.

In some embodiments, the data plane VCN 818 can be integrated with customer tenancies 870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 846. Code to run the function may be executed in the VMs 866(1)-(N), and the code may not be configured to run anywhere else on the data plane VCN 818. Each VM 866(1)-(N) may be connected to one customer tenancy 870. Respective containers 871(1)-(N) contained in the VMs 866(1)-(N) may be configured to run the code. In this case, there can be a dual isolation (e.g., the containers 871(1)-(N)

running code, where the containers 871(1)-(N) may be contained in at least the VM 866(1)-(N) that are contained in the untrusted app subnet(s) 862), which may help prevent incorrect or otherwise undesirable code from damaging the network of the IaaS provider or from damaging a network of a different customer. The containers 871(1)-(N) may be communicatively coupled to the customer tenancy 870 and may be configured to transmit or receive data from the customer tenancy 870. The containers 871(1)-(N) may not be configured to transmit or receive data from any other entity in the data plane VCN 818. Upon completion of running the code, the IaaS provider may kill or otherwise dispose of the containers 871(1)-(N).

In some embodiments, the trusted app subnet(s) 860 may run code that may be owned or operated by the IaaS provider. In this embodiment, the trusted app subnet(s) 860 may be communicatively coupled to the DB subnet(s) 830 and be configured to execute CRUD operations in the DB subnet(s) 830. The untrusted app subnet(s) 862 may be communicatively coupled to the DB subnet(s) 830, but in this embodiment, the untrusted app subnet(s) may be configured to execute read operations in the DB subnet(s) 830. The containers 871(1)-(N) that can be contained in the VM 866(1)-(N) of each customer and that may run code from the customer may not be communicatively coupled with the DB subnet(s) 830.

In other embodiments, the control plane VCN 816 and the data plane VCN 818 may not be directly communicatively coupled. In this embodiment, there may be no direct communication between the control plane VCN 816 and the data plane VCN 818. However, communication can occur indirectly through at least one method. An LPG 810 may be established by the IaaS provider that can facilitate communication between the control plane VCN 816 and the data plane VCN 818. In another example, the control plane VCN 816 or the data plane VCN 818 can make a call to cloud services 856 via the service gateway 836. For example, a call to cloud services 856 from the control plane VCN 816 can include a request for a service that can communicate with the data plane VCN 818.

Figure 9:
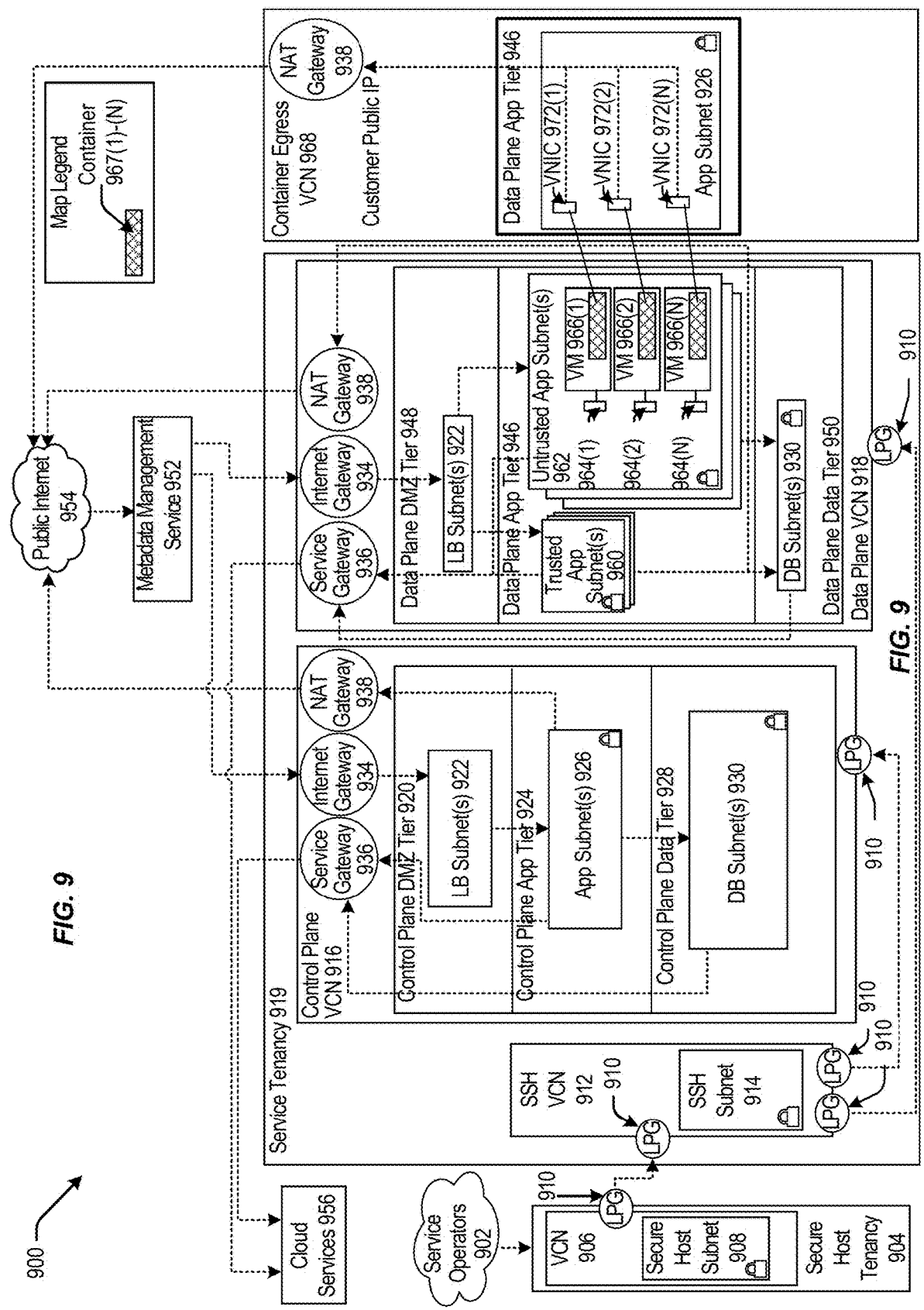
FIG. 9 is a block diagram illustrating another pattern for implementing a cloud infrastructure as a service system, according to at least one embodiment.
Figure 10:
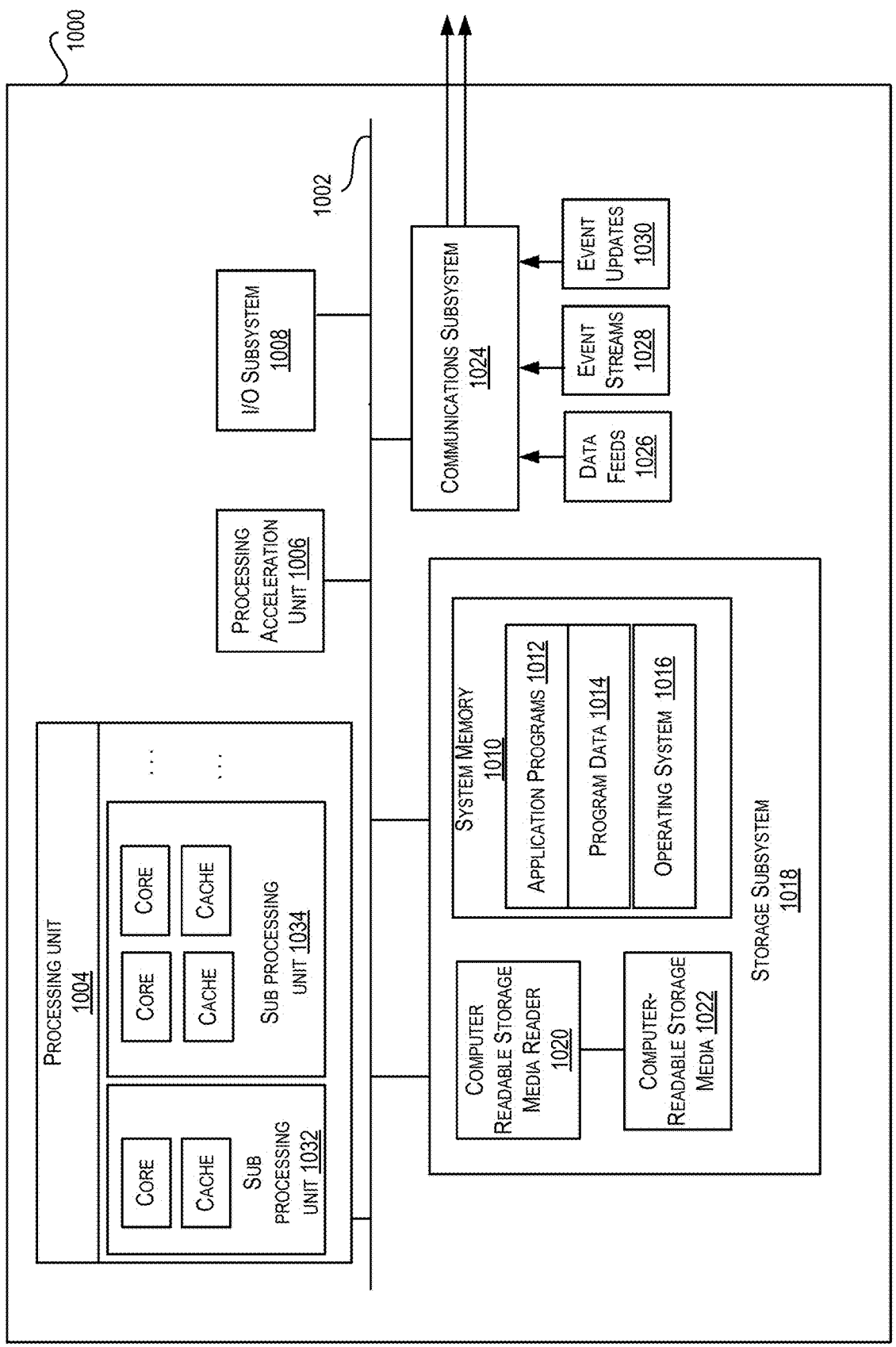
FIG. 10 is a block diagram illustrating an example computer system, according to at least one embodiment.

FIG. 9 is a block diagram 900 illustrating another example pattern of an IaaS architecture, according to at least one embodiment. Service operators 902 (e.g., service operators 602 of FIG. 6) can be communicatively coupled to a secure host tenancy 904 (e.g., the secure host tenancy 604 of FIG. 6) that can include a virtual cloud network (VCN) 906 (e.g., the VCN 606 of FIG. 6) and a secure host subnet 908 (e.g., the secure host subnet 608 of FIG. 6). The VCN 906 can include an LPG 910 (e.g., the LPG 610 of FIG. 6) that can be communicatively coupled to an SSH VCN 912 (e.g., the SSH VCN 612 of FIG. 6) via an LPG 910 contained in the SSH VCN 912. The SSH VCN 912 can include an SSH subnet 914 (e.g., the SSH subnet 614 of FIG. 6), and the SSH VCN 912 can be communicatively coupled to a control plane VCN 916 (e.g., the control plane VCN 616 of FIG. 6) via an LPG 910 contained in the control plane VCN 916 and to a data plane VCN 918 (e.g., the data plane 618 of FIG. 6) via an LPG 910 contained in the data plane VCN 918. The control plane VCN 916 and the data plane VCN 918 can be contained in a service tenancy 919 (e.g., the service tenancy 619 of FIG. 6).

The control plane VCN 916 can include a control plane DMZ tier 920 (e.g., the control plane DMZ tier 620 of FIG. 6) that can include LB subnet(s) 922 (e.g., LB subnet(s) 622 of FIG. 6), a control plane app tier 924 (e.g., the control plane app tier 624 of FIG. 6) that can include app subnet(s) 926 (e.g., app subnet(s) 626 of FIG. 6), a control plane data tier 928 (e.g., the control plane data tier 628 of FIG. 6) that can include DB subnet(s) 930 (e.g., DB subnet(s) 830 of FIG. 8). The LB subnet(s) 922 contained in the control plane DMZ tier 920 can be communicatively coupled to the app subnet(s) 926 contained in the control plane app tier 924 and to an Internet gateway 934 (e.g., the Internet gateway 634 of FIG. 6) that can be contained in the control plane VCN 916, and the app subnet(s) 926 can be communicatively coupled to the DB subnet(s) 930 contained in the control plane data tier 928 and to a service gateway 936 (e.g., the service gateway of FIG. 6) and a network address translation (NAT) gateway 938 (e.g., the NAT gateway 638 of FIG. 6). The control plane VCN 916 can include the service gateway 936 and the NAT gateway 938.

The data plane VCN 918 can include a data plane app tier 946 (e.g., the data plane app tier 646 of FIG. 6), a data plane DMZ tier 948 (e.g., the data plane DMZ tier 648 of FIG. 6), and a data plane data tier 950 (e.g., the data plane data tier 650 of FIG. 6). The data plane DMZ tier 948 can include LB subnet(s) 922 that can be communicatively coupled to trusted app subnet(s) 960 (e.g., trusted app subnet(s) 860 of FIG. 8) and untrusted app subnet(s) 962 (e.g., untrusted app subnet(s) 862 of FIG. 8) of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include primary VNICs 964(1)-(N) that can be communicatively coupled to tenant virtual machines (VMs) 966(1)-(N) residing within the untrusted app subnet(s) 962. Each tenant VM 966(1)-(N) can run code in a respective container 967(1)-(N), and be communicatively coupled to an app subnet 926 that can be contained in a data plane app tier 946 that can be contained in a container egress VCN 968. Respective secondary VNICs 972(1)-(N) can facilitate communication between the untrusted app subnet(s) 962 contained in the data plane VCN 918 and the app subnet contained in the container egress VCN 968. The container egress VCN can include a NAT gateway 938 that can be communicatively coupled to public Internet 954 (e.g., public Internet 654 of FIG. 6).

The Internet gateway 934 contained in the control plane VCN 916 and contained in the data plane VCN 918 can be communicatively coupled to a metadata management service 952 (e.g., the metadata management system 652 of FIG. 6) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively coupled to cloud services 956.

In some examples, the pattern illustrated by the architecture of block diagram 900 of FIG. 9 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 967(1)-(N) that are contained in the VMs 966(1)-(N) for each customer can be accessed in real-time by the customer. The containers 967(1)-(N) may be configured to make calls to respective secondary VNICs 972(1)-(N) contained in app subnet(s) 926 of the data plane app tier 946 that can be contained in the container egress VCN 968. The secondary VNICs 972(1)-(N) can transmit the calls to the NAT gateway 938 that may transmit the calls to public Internet 954. In this example, the containers 967(1)-(N) that can be accessed in real-time by the customer can be isolated from the control plane VCN 916 and can be isolated from other entities contained in the data plane VCN 918. The containers 967(1)-(N) may also be isolated from resources from other customers.

In other examples, the customer can use the containers 967(1)-(N) to call cloud services 956. In this example, the customer may run code in the containers 967(1)-(N) that requests a service from cloud services 956. The containers 967(1)-(N) can transmit this request to the secondary VNICs 972(1)-(N) that can transmit the request to the NAT gateway that can transmit the request to public Internet 954. Public Internet 954 can transmit the request to LB subnet(s) 922 contained in the control plane VCN 916 via the Internet gateway 934. In response to determining the request is valid, the LB subnet(s) can transmit the request to app subnet(s) 926 that can transmit the request to cloud services 956 via the service gateway 936.

It should be appreciated that IaaS architectures 600, 700, 800, 900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Example of a Computer System or Device

FIG. 10 illustrates an example computer system 1000, in which various embodiments may be implemented. The system 1000 may be used to implement any of the computer systems and processing systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some, or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1004 provide the functionality described above. Storage subsystem 1018 may also provide a repository for storing data used in accordance with the present disclosure.

As depicted in the example in FIG. 10, storage subsystem 1018 can include various components including a system memory 1010, computer-readable storage media 1022, and a computer readable storage media reader 1020. System memory 1010 may store program instructions that are loadable and executable by processing unit 1004. System memory 1010 may also store data that is used during the execution of the instructions and/or data that is generated during the execution of the program instructions. Various different kinds of programs may be loaded into system memory 1010 including but not limited to client applications, Web browsers, mid-tier applications, relational database management systems (RDBMS), virtual machines, containers, etc.

System memory 1010 may also store an operating system 1016. Examples of operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1000 executes one or more virtual machines, the virtual machines along with their guest operating systems (GOSs) may be loaded into system memory 1010 and executed by one or more processors or cores of processing unit 1004.

System memory 1010 can come in different configurations depending upon the type of computer system 1000. For example, system memory 1010 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1010 may include a basic input/output system (BIOS) containing basic routines that help to transfer information between elements within computer system 1000, such as during start-up.

Computer-readable storage media 1022 may represent remote, local, fixed, and/or removable storage devices plus storage media for temporarily and/or more permanently containing, storing, computer-readable information for use by computer system 1000 including instructions executable by processing unit 1004 of computer system 1000.

Computer-readable storage media 1022 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Machine-readable instructions executable by one or more processors or cores of processing unit 1004 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments provides an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A computer-implemented method comprising:
receiving, by a metrics management system and from a first machine-learning framework, first metric data for a first metric related to machine-learning processing;
determining, by the metrics management system, a first metric data type for the first metric data, wherein the first metric data type is determined from a set of different metric data types;
identifying, by the metrics management system and based upon the first metric data type and a source of the first metric data, a first adapter for processing the received first metric data, wherein the first adapter is configured to convert data in the first metric data type to metric data in a common metrics format specified by a common metrics schema;
generating, by the metrics management system and by using the first adapter, the metric data in the common metrics format for the first metric based upon the first metric data, the generating comprising:
identifying a first type converter;
converting the first metric data to the metric data in the common metrics format using the first type converter; and
storing, by the metrics management system, the metric data in the common metrics format for the first metric in a memory store;

receiving, from a first requestor, a first request for the first metric;

determining, based upon the first request, that data is to be provided in a first requestor format, wherein the first requestor format is different from the first metric data type and from the common metrics format; and responsive to determining that the data is to be provided in the first requestor format;

determining, by the metrics management system, a second type converter configured to convert the first metric from the common metrics format to the first requestor format;

converting, by the metrics management system and by using the second type converter, the metric data in the common metrics format for the first metric from the common metrics format to the first requestor format; and providing, by the metrics management system, the first metric to the first requestor in the first requestor format using the stored first common metrics format data.

2. The computer-implemented method of claim 1, wherein the common metrics format comprises a plurality of fields, wherein the plurality of fields comprises a metric description, a variable count, a variable dimension, a variable name, a variable type, a unit, a variable data type, raw data, and a type converter, wherein the variable type is selected from a group consisting of nominal, categorical, and continuous, wherein the variable data type is selected from a group consisting of integer, float, fraction, percentage, array, string, and tensor, wherein the raw data is a blob representation of the received first metric data, wherein the computer-implemented method further comprises identifying a plurality of data included in the first metric data, wherein the plurality of data corresponds to the plurality of fields, and wherein the method further comprises identifying, for each field of the plurality of fields, corresponding data included in the plurality of data to convert the first metric data.

3. The computer-implemented method of claim 1, further comprising:

receiving second metric data for a second metric from a second machine-learning framework, the second metric data having a second metric data type; and updating the set of different metric data types to add the second metric data type in response to determining that a second metric data type of the second metric data is different from existing metric data types included in the set of different metric data types.

4. The computer-implemented method of claim 1, wherein identifying the first adapter comprises identifying the first adapter based on the source of the first metric data, the method further comprising determining the source of the first metric data.

5. The computer-implemented method of claim 1, further comprising:

receiving second metric data for a second metric related to machine-learning processing;

determining a second metric data type for the second metric;

identifying a second adapter for processing the received second metric;

generating second common metrics format data for the second metric based upon the second metric data and using the second adapter, the generating comprising converting the second metric data from the second metric data type to the common metrics format;

storing the second common metrics format data in the memory store; and responsive to a second request from a second requestor requesting the second metric in a second requestor format, providing the second metric to the second requestor in the second requestor format using the stored second common metrics format data.

6. The computer-implemented method of claim 5, wherein receiving the second metric data comprises receiving the second metric data from a second particular source that is different than a first particular source associated with the first metric data, and wherein the second adapter is different than the first adapter.

7. The computer-implemented method of claim 1, wherein generating first common metrics format data comprises:

extracting predefined data from the first metric data for at least a subset of a plurality of fields included in the common metrics format;

using the first adapter to call a particular type converter to convert the first metric data from the first metric data type to the common metrics format; and converting, using the particular type converter, the first metric data from the first metric data type into a blob or a list of list of strings for at least one field of the plurality of fields to prevent data from being lost during processing.

8. A system comprising:

one or more processors; and a memory coupled to the one or more processors, the memory storing a plurality of instructions executable by the one or more processors, the plurality of instructions comprising instructions executable by the one or more processors to cause the one or more processors to perform operations comprising:

receiving, from a first machine-learning framework, first metric data for a first metric related to machine-learning processing;

determining a first metric data type for the first metric data, wherein the first metric data type is determined from a set of different metric data types;

identifying, based upon the first metric data type and a source of the first metric data, a first adapter for processing the received first metric data, wherein the first adapter is configured to convert data in the first metric data type to metric data in a common metrics format specified by a common metrics schema;

generating, by using the first adapter, the metric data in the common metrics format for the first metric based upon the first metric data, the generating comprising:

identifying a first type converter; and converting the first metric data to the metric data in the common metrics format using the first type converter;

the metric data in the common metrics format for the first metric in a memory store;

receiving, from a first requestor, a first request for the first metric determining, based upon the first request, that data is to be provided in a first requestor format, wherein the first requestor format is different from the first metric data type and from the common metrics format; and responsive to determining that the data is to be provided in the first requestor format;

determining a second type converter configured to convert the first metric from the common metrics format to the first requestor format;

converting, by using the second type converter, the
metric data in the common metrics format for the
first metric from the common metrics format to the
first requestor format; and
providing the first metric to the first requestor in the
first requestor format.

9. The system of claim 8, wherein the common metrics format comprises a plurality of fields, wherein the plurality of fields comprises a metric description, a variable count, a variable dimension, a variable name, a variable type, a unit, a variable data type, raw data, and a type converter, and wherein the variable type is selected from a group consisting of nominal, categorical, and continuous, wherein the variable data type is selected from a group consisting of integer, float, fraction, percentage, array, string, and tensor, and wherein the raw data is a blob representation of the received first metric data.

10. The system of claim 9, wherein the operations further comprise identifying a plurality of data included in the first metric data, wherein the plurality of data corresponds to the plurality of fields, and wherein the operations further comprise identifying, for each field of the plurality of fields, corresponding data included in the plurality of data to convert the first metric data.

11. The system of claim 9, wherein the operation of identifying the first adapter comprises identifying based on the source of the first metric data, the operations further comprising determining the source of the first metric data.

12. The system of claim 9, wherein the operations further comprise:
receiving second metric data for a second metric related to machine-learning processing;
determining a second metric data type for the second metric;
identifying a second adapter for processing the received second metric;
generating second common metrics format data for the second metric based upon the second metric data and using the second adapter, the generating comprising converting the second metric data from the second metric data type to the common metrics format;
storing the second common metrics format data in the memory store; and
responsive to a second request from a second requestor requesting the second metric in a second requestor format, providing the second metric to the second requestor in the second requestor format using the stored second common metrics format data.

13. The system of claim 12, wherein the operation of receiving the second metric data comprises receiving the second metric data from a second particular source that is different than a first particular source associated with the first metric data, and wherein the second adapter is different than the first adapter.

14. The system of claim 8, wherein the operation of generating first common metrics format data comprises:
extracting predefined data from the first metric data for at least a subset of a plurality of fields included in the common metrics format;
using the first adapter to call a particular type converter to convert the first metric data from the first metric data type to the common metrics format; and
converting, using the particular type converter, the first metric data from the first metric data type into a blob or a list of list of strings for at least one field of the plurality of fields to prevent data from being lost during processing.

15. A non-transitory computer-readable memory storing a plurality of instructions executable by one or more processors, the plurality of instructions comprising instructions that, when executed by the one or more processors, cause the one or more processors to perform operations, comprising:
receiving, from a first machine-learning framework, first metric data for a first metric related to machine-learning processing;
determining a first metric data type for the first metric data, wherein the first metric data type is determined from a set of different metric data types;
identifying, based upon the first metric data type and a source of the first metric data, a first adapter for processing the received first metric data, wherein the first adapter is configured to convert data in the first metric data type to metric data in a common metrics format specified by a common metrics schema;
generating, by using the first adapter, the metric data in the common metrics format for the first metric based upon the first metric data, the generating comprising:
identifying a first type converter; and
converting the first metric data to the metric data in the common metrics format using the first type converter;
storing the metric data in the common metrics format for the first metric in a memory store;
receiving, from a first requestor, a first request for the first metric;
determining, based upon the first request, that data is to be provided in a first requestor format, wherein the first requestor format is different from the first metric data type and from the common metrics format; and
responsive to determining that the data is to be provided in the first requestor format;
determining a second type converter configured to convert the first metric from the common metrics format to the first requestor format;
converting, by using the second type converter, the metric data in the common metrics format for the first metric from the common metrics format to the first requestor format; and
providing, the first metric to the first requestor in the first requestor format.

16. The non-transitory computer-readable memory of claim 15, wherein the common metrics format comprises a plurality of fields, wherein the plurality of fields comprises a metric description, a variable count, a variable dimension, a variable name, a variable type, a unit, a variable data type, raw data, and a type converter, and wherein the variable type is selected from a group consisting of nominal, categorical, and continuous, wherein the variable data type is selected from a group consisting of integer, float, fraction, percentage, array, string, and tensor, and wherein the raw data is a blob representation of the received first metric data.

17. The non-transitory computer-readable memory of claim 16, wherein the operations further comprise identifying a plurality of data included in the first metric data, wherein the plurality of data corresponds to the plurality of fields, and wherein the operation further comprise identifying, for each field of the plurality of fields, corresponding data included in the plurality of data to convert the first metric data.

18. The non-transitory computer-readable memory of claim 16, wherein the operation of, identifying the first adapter comprises identifying based on the source of the first metric data, the operations further comprising determining the source of the first metric data.

19. The non-transitory computer-readable memory of claim 16, wherein the operations further comprise:
receiving second metric data for a second metric related to machine-learning processing;
determining a second metric data type for the second metric;
identifying a second adapter for processing the received second metric;
generating second common metrics format data for the second metric based upon the second metric data and using the second adapter, the generating comprising converting the second metric data from the second metric data type to the common metrics format;
storing the second common metrics format data in the memory store; and
responsive to a second request from a second requestor requesting the second metric in a second requestor format, providing the second metric to the second requestor in the second requestor format using the stored second common metrics format data, wherein the operation of receiving the second metric data comprises receiving the second metric data from a second particular source that is different than a first particular source associated with the first metric data, and wherein the second adapter is different than the first adapter.

20. The non-transitory computer-readable memory of claim 15, wherein the operation of generating first common metrics format data comprises:
extracting predefined data from the first metric data for at least a subset of a plurality of fields included in the common metrics format;
using the first adapter to call a particular type converter to convert the first metric data from the first metric data type to the common metrics format; and
converting, using the particular type converter, the first metric data from the first metric data type into a blob or a list of list of strings for at least one field of the plurality of fields to prevent data from being lost during processing.

* * * * *